US012475850B2

(12) United States Patent
Seo et al.

(10) Patent No.: US 12,475,850 B2
(45) Date of Patent: Nov. 18, 2025

(54) DISPLAY APPARATUS

(71) Applicant: Samsung Display Co., Ltd., Yongin-Si (KR)

(72) Inventors: Hee-Jeong Seo, Yongin-si (KR); Sooyeon Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/966,124

(22) Filed: Dec. 3, 2024

(65) Prior Publication Data

US 2025/0273143 A1 Aug. 28, 2025

(30) Foreign Application Priority Data

Feb. 27, 2024 (KR) ........................ 10-2024-0028363

(51) Int. Cl.
*G09G 3/3275* (2016.01)
*G09G 3/3233* (2016.01)

(52) U.S. Cl.
CPC ... *G09G 3/3233* (2013.01); *G09G 2300/0452* (2013.01); *G09G 2300/0819* (2013.01); *G09G 2300/0842* (2013.01); *G09G 2300/0861* (2013.01); *G09G 2310/08* (2013.01); *G09G 2320/041* (2013.01); *G09G 2320/043* (2013.01); *G09G 2330/021* (2013.01)

(58) Field of Classification Search
CPC ......... G09G 3/3233; G09G 2300/0452; G09G 2300/0819; G09G 2300/0842; G09G 2300/0861; G09G 2310/08; G09G 2320/041; G09G 2320/043; G09G 2330/021; G09G 3/3275; G09G 3/3283; G09G 3/3291
See application file for complete search history.

(56) References Cited

U.S. PATENT DOCUMENTS

| | | | | |
|---|---|---|---|---|
| 11,798,478 | B2 | 10/2023 | Park et al. | |
| 2012/0081410 | A1 | 4/2012 | Yeo et al. | |
| 2022/0028324 | A1 | 1/2022 | Kim et al. | |
| 2022/0415258 | A1* | 12/2022 | Park | G09G 3/3241 |

(Continued)

FOREIGN PATENT DOCUMENTS

| | | | |
|---|---|---|---|
| KR | 10-2012-0033622 | A | 4/2012 |
| KR | 10-2012-0047538 | A | 5/2012 |

(Continued)

*Primary Examiner* — Dennis P Joseph
(74) *Attorney, Agent, or Firm* — Innovation Counsel LLP

(57) ABSTRACT

A display apparatus includes a display panel, a data driver and a channel controller. The display panel includes a first data line connected to third sub-pixels in first and third pixel columns, a second data line connected to second sub-pixels in a second pixel column, a third data line connected to first sub-pixels in a third pixel column, a fourth data line connected to second sub-pixels in a fourth pixel column, and an additional data line connected to first sub-pixels in the first pixel column. The data driver includes an additional source channel providing an additional data voltage to the additional data line, and adjusts a voltage level of the additional data voltage by applying an offset value. The channel controller selects the additional source channel among the plurality of source channels, and generates the offset value for the additional source channel.

20 Claims, 23 Drawing Sheets

(56) References Cited

U.S. PATENT DOCUMENTS

| | | | | |
|---|---|---|---|---|
| 2023/0186814 | A1* | 6/2023 | Yang .................... | G09G 3/2003 345/204 |
| 2023/0290313 | A1* | 9/2023 | Seo ...................... | G09G 3/3233 |
| 2024/0135862 | A1 | 4/2024 | Seo et al. | |

FOREIGN PATENT DOCUMENTS

| | | | |
|---|---|---|---|
| KR | 10-2020-0079964 | A | 7/2020 |
| KR | 10-2022-0012546 | A | 2/2022 |
| KR | 10-2023-0000531 | A | 1/2023 |

* cited by examiner

FIG. 9

| CH# | 1 | 2 | 3 | … | 80 | 81 | 82 | 83 | 84 | … | 877 | 878 | 879 | 880 | 881 | … | 1078 | 1079 | 1080 |
|---|---|---|---|---|---|---|---|---|---|---|---|---|---|---|---|---|---|---|---|
| CASE1 | S1 | S2 | S3 | … | S80 | S81 | S82 | S83 | S84 | … | S877 | S878 | S879 | S880 | S881 | … | S1078 | S1079 | S1080 |
| CASE2 | S1 | S2 | S3 | … | S80 | S481 | S480 | S482 | S479 | … | S879 | S82 | S880 | S81 | S881 | … | S1078 | S1079 | S1080 |

DISPLAY APPARATUS

CROSS-REFERENCE TO RELATED APPLICATION(S)

This application claims priority under 35 USC § 119 to Korean Patent Applications No. 10-2024-0028363, filed on Feb. 27, 2024 in the Korean Intellectual Property Office (KIPO), the contents of which are incorporated herein by reference in its entirety.

BACKGROUND

1. Technical Field

Example embodiments relate generally to displaying images, and more particularly to display apparatuses for improving display quality.

2. Description of the Related Art

A flat panel display (FPD), which is easy to cover a large area and is able to be thin and lightweight, is widely used as a display apparatus in recent years. The FPD may include, but are not limited to, a liquid crystal display (LCD) and an organic light emitting display (OLED), for example.

Each pixel included in a display apparatus may have various pixel structures by disposing sub-pixels emitting lights of red, green and blue in various shapes and arrangements. For example, each pixel may have a PENTILE™ pixel structure, a DIAMOND PIXEL™ structure, or the like. Various methods to efficiently operate display apparatuses including such various pixel structures are being proposed.

SUMMARY

Some example embodiments provide a display apparatus capable of preventing degradation of display quality while including a display panel having a structure for reducing power consumption According to some example embodiments, a display apparatus includes a display panel, a data driver and a channel controller. The display panel includes a plurality of sub-pixels, a plurality of pixel columns and a plurality of data line. Each of the plurality of sub-pixels includes a pixel circuit and a light emitting element, and the plurality of sub-pixels include first sub-pixels displaying a first color, second sub-pixels displaying a second color, and third sub-pixels displaying a third color. The plurality of pixel columns include a first pixel column in which the first sub-pixels and the third sub-pixels are alternately disposed, a second pixel column in which the second sub-pixels are disposed, a third pixel column in which the third sub-pixels and the first sub-pixels are alternately disposed, and a fourth pixel column in which the second sub-pixels are disposed. The plurality of data lines include a first data line connected to the third sub-pixels in the first and third pixel columns, a second data line connected to the second sub-pixels in the second pixel column, a third data line connected to the first sub-pixels in the third pixel column, a fourth data line connected to the second sub-pixels in the fourth pixel column, and an additional data line connected to the first sub-pixels in the first pixel column. The data driver adjusts a voltage level of an additional data voltage by applying an offset value to the additional data voltage, and includes a plurality of source channels. The plurality of source channels include a first source channel providing a first data voltage corresponding to the third color to the first data line, a second source channel providing a second data voltage corresponding to the second color to the second data line, a third source channel providing a third data voltage corresponding to the first color to the third data line, a fourth source channel providing a fourth data voltage corresponding to the second color to the fourth data line, and an additional source channel providing the additional data voltage corresponding to the first color to the additional data line. The channel controller selects the additional source channel among the plurality of source channels, and generates the offset value for the additional source channel.

In example embodiments, the offset value may be changeable.

In example embodiments, the channel controller may change the offset value applied to the additional data voltage depending on positions of the first sub-pixels in the first pixel column connected to the additional data line.

In example embodiments, the channel controller may select at least one selected source channel other than the additional source channel among the plurality of source channels, and may generate a second offset value for the at least one selected source channel. The data driver may adjust a voltage level of a selected data voltage provided by the at least one selected source channel by applying the second offset value to the selected data voltage.

In example embodiments, the display apparatus may further include a temperature sensor detecting an operating temperature. The channel controller may select the at least one selected source channel based on the operating temperature detected by the temperature sensor.

In example embodiments, the channel controller may select the at least one selected source channel based on luminance of an image displayed on the display panel.

In example embodiments, the channel controller may select the at least one selected source channel based on positions of the plurality of source channels.

In example embodiments, among the plurality of source channels, a source channel connected to sub-pixels disposed at a center of the display panel may be selected as the at least one selected source channel.

In example embodiments, the plurality of pixel columns may further include a fifth pixel column in which the first sub-pixels and the third sub-pixels are alternately disposed, a sixth pixel column in which the second sub-pixels are disposed, a seventh pixel column in which the third sub-pixels and the first sub-pixels are alternately disposed, and an eighth pixel column in which the second sub-pixels are disposed. The plurality of data lines may further include a fifth data line connected to the third sub-pixels in the fifth and seventh pixel columns, a sixth data line connected to the second sub-pixels in the sixth pixel column, a seventh data line connected to the first sub-pixels in the seventh pixel column, and an eighth data line connected to the second sub-pixels in the eighth pixel column. The display panel may further include first fan-out lines connected to the first, second, third and fourth data lines, and second fan-out lines connected to the fifth, sixth, seventh and eighth data lines. The first fan-out lines and the second fan-out lines may be alternately disposed in a peripheral region of the display panel.

In example embodiments, the plurality of source channels may further include a fifth source channel providing a fifth data voltage corresponding to the third color to the fifth data line, a sixth source channel providing a sixth data voltage corresponding to the second color to the sixth data line, a seventh source channel providing a seventh data voltage corresponding to the first color to the seventh data line, and an eighth source channel providing an eighth data voltage corresponding to the second color to the eighth data line. A source output remapping may be performed on at least some of the first, second, third, fourth, fifth, sixth, seventh and eighth source channels. The channel controller may select remapped source channels on which the source output remapping is performed among the first, second, third, fourth, fifth, sixth, seventh and eighth source channels, and may generate a second offset value for the remapped source channels. The data driver may apply the second offset value to data voltages provided by the remapped source channels.

According to some example embodiments, a display apparatus includes a display panel, a data driver and a channel controller. The display panel includes a plurality of sub-pixels, a plurality of data lines and a plurality of fan-out line. Each of the plurality of sub-pixels includes a pixel circuit and a light emitting element, and the plurality of sub-pixels include first sub-pixels displaying a first color, second sub-pixels displaying a second color, and third sub-pixels displaying a third color. The plurality of data lines include first data lines connected to the first sub-pixels, second data lines connected to the second sub-pixels, and third data lines connected to the third sub-pixels. The plurality of fan-out lines include first fan-out lines connected to data lines connected to sub-pixels disposed in a first display region of the display panel, second fan-out lines connected to data lines connected to sub-pixels disposed in a second display region of the display panel, and third fan-out lines connected to data lines connected to sub-pixels disposed in a third display region of the display panel. The second display region is adjacent to the first display region, and the first fan-out lines and the second fan-out lines are alternately disposed in a peripheral region of the display panel. The third display region is adjacent to the second display region. The data driver outputs remapped data voltages to remapped source channels on which a source output remapping is performed, adjusts voltage levels of the remapped data voltages by applying an offset value to the remapped data voltages, and includes a plurality of source channels. The plurality of source channels include first source channels providing first data voltages corresponding to the first color to the first data lines, second source channels configured to provide second data voltages corresponding to the second color to the second data lines, and third source channels configured to provide third data voltages corresponding to the third color to the third data lines. The channel controller selects the remapped source channels that is some of the plurality of source channels, and generates the offset value for the remapped source channels.

In example embodiments, the offset value may be changeable.

In example embodiments, the channel controller may change the offset value applied to the remapped data voltages depending on positions of the remapped source channels.

In example embodiments, the channel controller may select at least one selected source channel other than the remapped source channels among the plurality of source channels, and may generate a second offset value for the at least one selected source channel. The data driver may adjust a voltage level of a selected data voltage provided by the at least one selected source channel by applying the second offset value to the selected data voltage.

In example embodiments, the display apparatus may further include a temperature sensor detecting an operating temperature. The channel controller may select the at least one selected source channel based on the operating temperature detected by the temperature sensor.

In example embodiments, the channel controller may select the at least one selected source channel based on luminance of an image displayed on the display panel.

In example embodiments, the channel controller may select the at least one selected source channel based on positions of the plurality of source channels.

In example embodiments, among the plurality of source channels, a source channel connected to sub-pixels disposed at a center of the display panel may be selected as the at least one selected source channel.

In example embodiments, the display panel may further include a plurality of pixel columns. The plurality of pixel columns may include a first pixel column in which the first sub-pixels and the third sub-pixels are alternately disposed, a second pixel column in which the second sub-pixels are disposed, a third pixel column in which the third sub-pixels and the first sub-pixels are alternately disposed, and a fourth pixel column in which the second sub-pixels are disposed. One of the third data lines may be connected to the third sub-pixels in the first and third pixel columns. One of the second data lines may be connected to the second sub-pixels in the second pixel column. One of the first data lines may be connected to the first sub-pixels in the third pixel column. Another one of the second data lines may be connected to the second sub-pixels in the fourth pixel column. The plurality of data lines may further include an additional data line connected to the first sub-pixels in the first pixel column. The plurality of fan-out lines may further include a fourth fan-out line connected to the additional data line.

In example embodiments, the plurality of source channels may further include an additional source channel configured to provide an additional data voltage corresponding to the first color to the additional data line. The channel controller may select the additional source channel, and may generate a second offset value for the additional source channel. The data driver may apply the second offset value to the additional data voltage provided by the additional source channel.

In the display apparatus according to example embodiments, the source channel to which the offset value is applied may be selected depending on the structure and driving scheme of the display panel, and another source channel to which another offset value is applied may be additionally selected depending on the characteristics and/or operating environment of the display panel. For example, the offset values may be applied differently for channels and/or lines in the display apparatus, and the offset values may be applied further differently for temperature, luminance and/or positions in the display apparatus. Accordingly, the load deviation may be efficiently compensated, and the degradation of display quality may be prevented.

BRIEF DESCRIPTION OF THE DRAWINGS

Illustrative, non-limiting example embodiments will be more clearly understood from the following detailed description taken in conjunction with the accompanying drawings.

FIGS. 9, 10A and 10B are diagrams for describing an operation of a display panel and a data driver of FIGS. 6, 7 and 8.

DETAILED DESCRIPTION OF THE EMBODIMENTS

Figure 1:
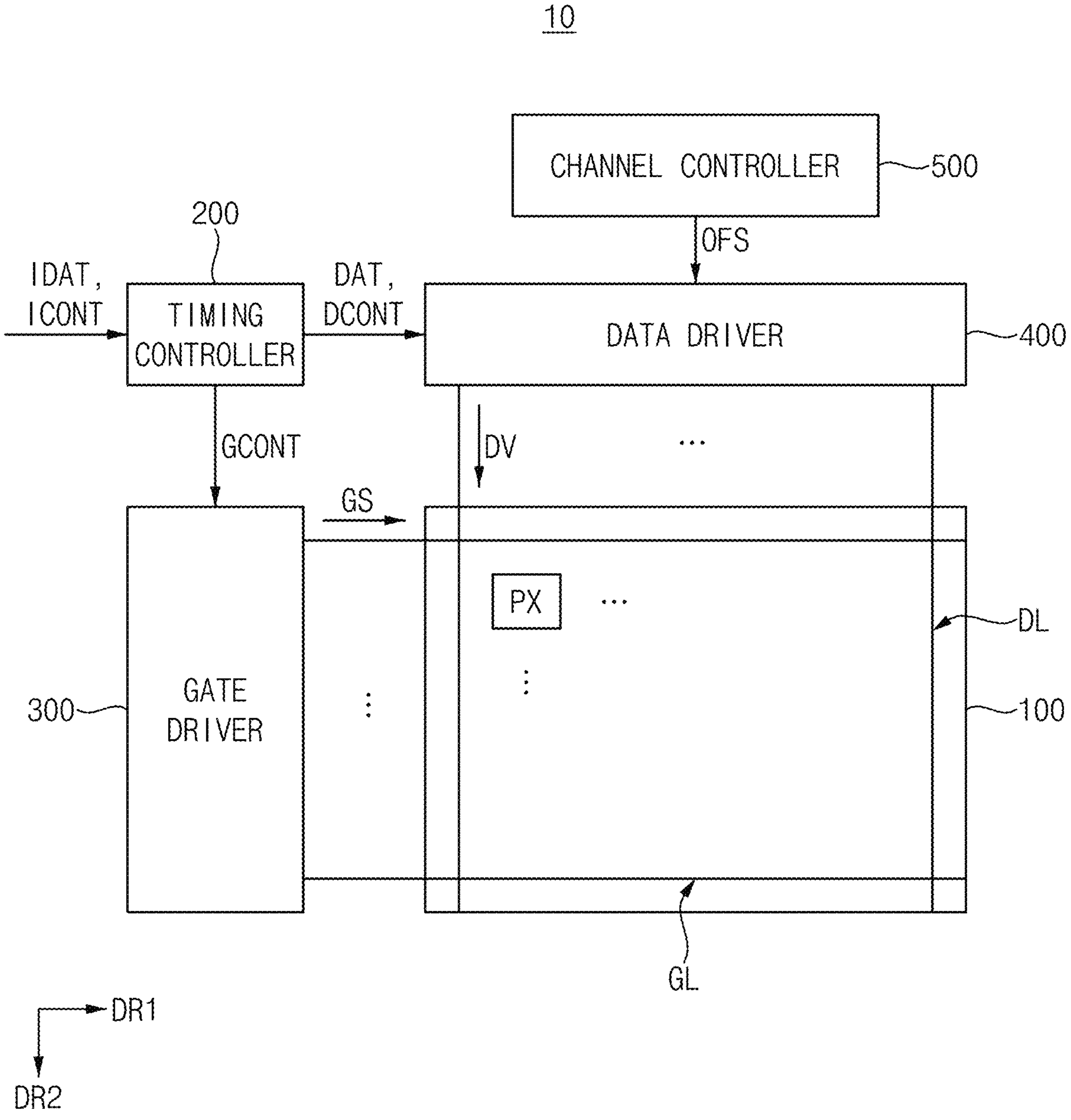
FIG. 1 is a block diagram illustrating a display apparatus according to example embodiments.

The example embodiments are described more fully hereinafter with reference to the accompanying drawings. Like or similar reference numerals refer to like or similar elements throughout.

FIG. 1 is a block diagram illustrating a display apparatus 10 according to example embodiments.

Referring to FIG. 1, the display apparatus 10 includes a display panel 100, a data driver 400 and a channel controller 500. The display apparatus 10 may further include a timing controller 200 and a gate driver 300.

The display panel 100 operates (e.g., display an image) based on output image data DAT. The display panel 100 is connected to a plurality of gate lines GL and a plurality of data lines DL. The plurality of gate lines GL may extend in a first direction DR1, and the plurality of data lines DL may extend in a second direction DR2 crossing (e.g., substantially perpendicular to) the first direction DR1.

The display panel 100 includes a plurality of sub-pixels PX that are arranged in a matrix formation. Each of the plurality of sub-pixels PX may be electrically connected to a respective one of the plurality of gate lines GL and a respective one of the plurality of data lines DL. For example, as will be described with reference to FIG. 6, the display panel 100 may include a display region including the plurality of sub-pixels PX and a peripheral region surrounding the display region.

In example embodiments, the display panel 100 may be an organic light emitting display (OLED) panel, and each of the plurality of sub-pixels PX may be a sub-pixel for the OLED panel that includes an organic light emitting diode and a driving transistor. In example embodiments, the display panel 100 may be a liquid crystal display (LCD) panel, and each of the plurality of sub-pixels PX may be a sub-pixel for the LCD panel that includes a liquid crystal and a driving transistor. In example embodiments, the display panel 100 may be a micro light emitting diode (LED) display panel, an inorganic light emitting display panel or a quantum dot light emitting display (QLED) panel. However, example embodiments are not limited thereto, and the display panel 100 and the plurality of sub-pixels PX may be implemented in various manners.

In example embodiments, the plurality of sub-pixels PX may include a plurality of red sub-pixels outputting red light, a plurality of green sub-pixels outputting green light and a plurality of blue sub-pixels outputting blue light. In example embodiments, the plurality of sub-pixels PX may include a plurality of yellow sub-pixels outputting yellow light, a plurality of cyan sub-pixels outputting cyan light and a plurality of magenta sub-pixels outputting magenta light. In example embodiments, the plurality of sub-pixels PX may further include a plurality of white sub-pixels outputting white light, or may include sub-pixels outputting light of other colors.

The timing controller 200 controls operations of the display panel 100, the gate driver 300 and the data driver 400. The timing controller 200 receives input image data IDAT and an input control signal ICONT from an external device (e.g., a host device or a graphic processor). For example, the input image data IDAT may include a plurality of sub-pixel data for the plurality of sub-pixels PX. For example, the input control signal ICONT may include a master clock signal, a data enable signal, a vertical synchronization signal, a horizontal synchronization signal, etc.

The timing controller 200 generates the output image data DAT based on the input image data IDAT. For example, the timing controller 200 may selectively perform an image quality compensation, a spot compensation, an adaptive color correction (ACC) and/or a dynamic capacitance compensation (DCC) on the input image data IDAT to generate the output image data DAT.

The timing controller 200 generates a first control signal GCONT for controlling the gate driver 300 and a second control signal DCONT for controlling the data driver 400 based on the input control signal ICONT. For example, the first control signal GCONT may include a vertical start signal, a gate clock signal etc. For example, the second control signal DCONT may include a horizontal start signal, a data clock signal, a data load signal, etc.

The gate driver 300 is connected to the display panel 100 through the plurality of gate lines GL. The gate driver 300 generates a plurality of gate signals GS for driving the display panel 100 based on the first control signal GCONT. For example, the gate driver 300 may sequentially apply or provide the plurality of gate signals GS to the display panel 100 through the plurality of gate lines GL.

In example embodiments, the gate driver 300 may be an amorphous silicon gate (ASG) unit that is integrated on the peripheral region of the display panel 100. In example embodiments, the gate driver 300 may be disposed at any region that is located outside the display panel 100.

The data driver 400 is connected to the display panel 100 through the plurality of data lines DL. The data driver 400 generates a plurality of data voltages DV (e.g., analog voltages) for driving the display panel 100 based on the output image data DAT (e.g., digital data) and the second control signal DCONT. For example, the data driver 400 may sequentially apply or provide the plurality of data voltages DV to a plurality of lines (e.g., horizontal lines) in the display panel 100 through the plurality of data lines DL.

In example embodiments, the data driver 400 may be disposed, e.g., directly mounted, on the display panel 100, or may be connected to the display panel 100 in a tape carrier package (TCP) type. In an embodiment, the data driver 400 may be integrated on the display panel 100.

In example embodiments, the timing controller 200, the gate driver 300 and the data driver 400 may be implemented as one integrated circuit (IC). In example embodiments, the timing controller 200, the gate driver 300 and the data driver 400 may be implemented as two or more ICs. A driving module including at least the timing controller 200 and the data driver 400 may be referred to as a timing controller embedded data driver (TED).

As will be described with reference to FIGS. 4 and 7, the data driver 400 may include a plurality of source channels that provide the plurality of data voltages DV to the plurality of data lines DL. The channel controller 500 may select at least one source channel among the plurality of source channels, and may generate an offset signal OFS including an offset value applied to the selected source channel. The data driver 400 may adjust a voltage level of a data voltage provided by the selected source channel by applying the offset value to the data voltage provided by the selected source channel based on the offset signal OFS. For example, when an image having the same color and the same grayscale (or luminance or brightness) is to be displayed on the display panel 100 using the selected source channel to which the offset value is applied and an unselected source channel to which the offset value is not applied, a voltage level of the data voltage provided by the selected source channel and a voltage level of a data voltage provided by the unselected source channel may be different from each other. For example, the offset value may be changeable or variable.

In example embodiments, as will be described with reference to FIGS. 3A, 3B, 4, 6, 7, 8, 11 and 12, the display panel 100 may be implemented with various structures, and a source channel to which the offset value is applied may be selected and/or determined depending on a structure and a driving scheme of the display panel 100. In example embodiments, as will be described with reference to FIGS. 13, 15 and 17, another source channel to which another offset value is applied may be additionally selected and/or determined depending on characteristics and/or operating environment of the display panel 100.

Figure 2:
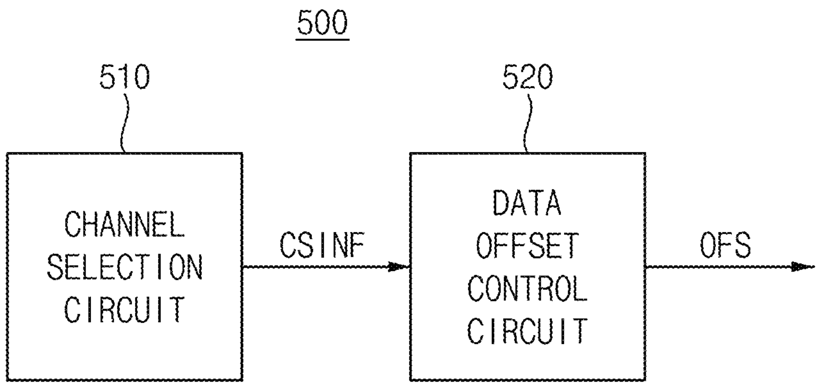
FIG. 2 is a block diagram illustrating an example of a channel controller that is included in a display apparatus according to example embodiments.

FIG. 2 is a block diagram illustrating an example of a channel controller 500 that is included in a display apparatus according to example embodiments.

Referring to FIG. 2, the channel controller 500 may include a channel selection circuit 510 and a data offset control circuit 520.

The channel selection circuit 510 may provide channel selection information CSINF for selecting at least one of the plurality of source channels included in the data driver 400. For example, the channel selection information CSINF may be pre-stored or stored in advance depending on the structure and driving scheme of the display panel 100. For example, the channel selection information CSINF may be additionally provided depending on the characteristics and/or the operating environment of the display panel 100.

The data offset control circuit 520 may generate the offset signal OFS, which includes the offset value applied to the selected source channel, based on the channel selection information CSINF. For example, the offset value may be stored in the form of a look-up table (LUT).

In example embodiments, at least some of components and/or elements of the channel controller 500 may be included in the data driver 400 and/or the timing controller 200.

Figure 3A:
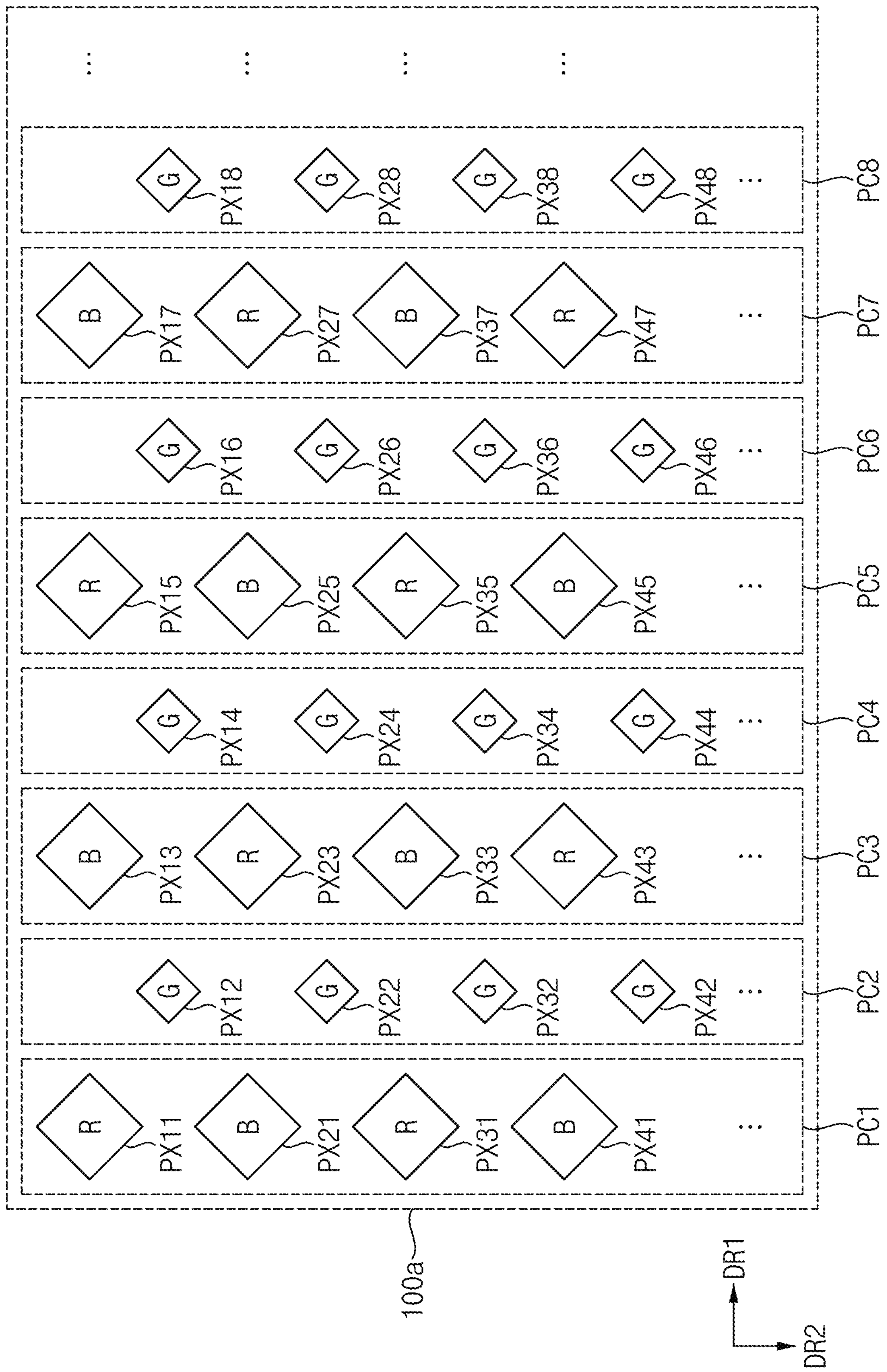
FIGS. 3A, 3B and 4 are diagrams illustrating an example of a display panel and a data driver that are included in a display apparatus according to example embodiments.
Figure 3B:
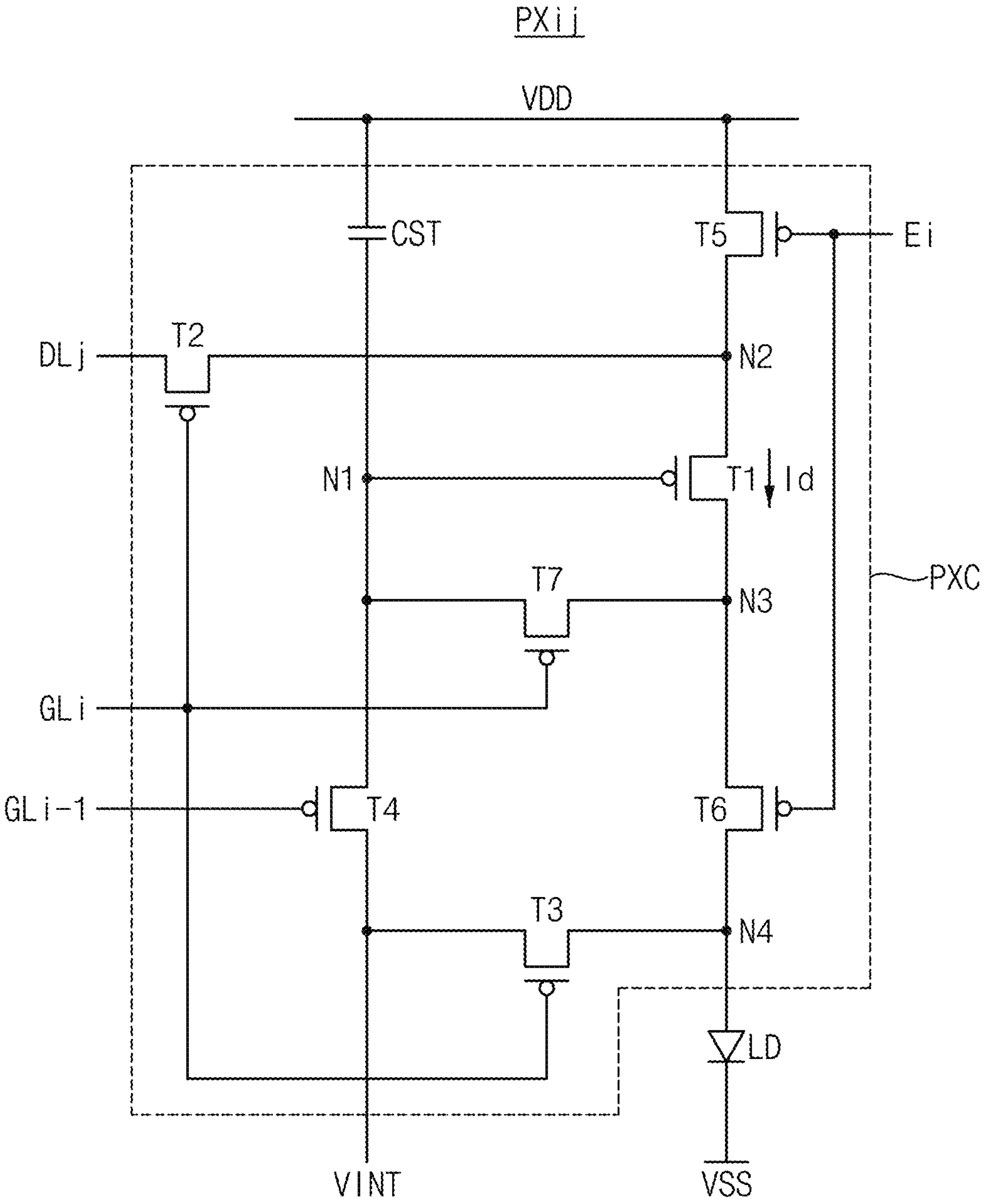
Figure 4:
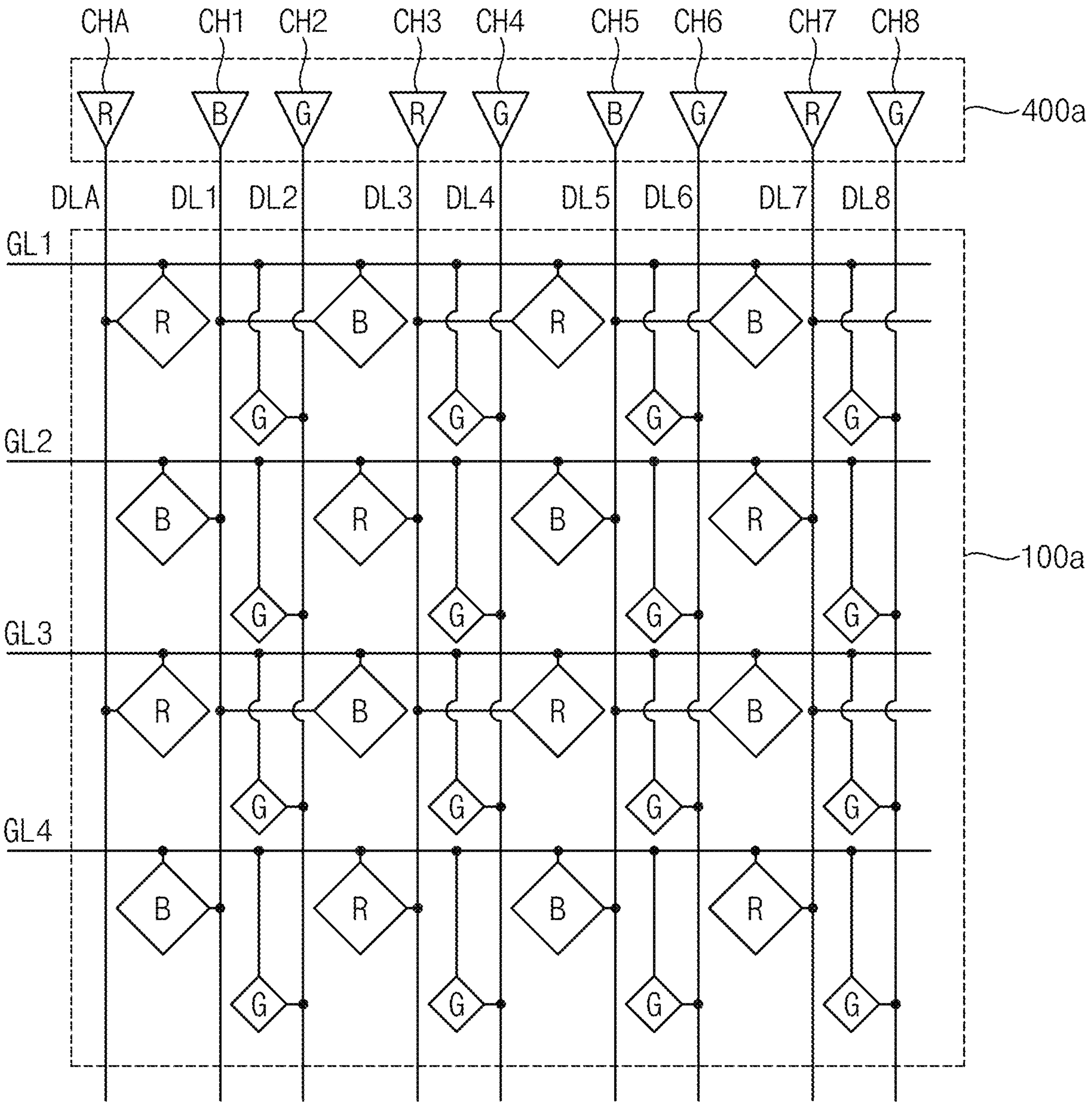

FIGS. 3A, 3B and 4 are diagrams illustrating an example of a display panel 100*a* and a data driver 400*a* that are included in a display apparatus according to example embodiments.

Referring to FIGS. 3A, 3B and 4, a display panel 100*a* may include a plurality of sub-pixels PX11, PX21, PX31, PX41, PX12, PX22, PX32, PX42, PX13, PX23, PX33, PX43, PX14, PX24, PX34, PX44, PX15, PX25, PX35, PX45, PX16, PX26, PX36, PX46, PX17, PX27, PX37, PX47, PX18, PX28, PX38 and PX48, a plurality of pixel columns PC1, PC2, PC3, PC4, PC5, PC6, PC7 and PC8, a plurality of data lines DL1, DL2, DL3, DL4, DL5, DL6, DL7, DL8 and DLA, and a plurality of gate lines GL1, GL2, GL3 and GL4.

The plurality of sub-pixels PX11 to PX48 may include first sub-pixels R displaying a first color, second sub-pixels G displaying a second color, and third sub-pixels B displaying a third color. FIGS. 3A and 4 illustrate an example where the first, second and third colors are red, green and blue, respectively. However, example embodiments are not limited thereto.

The first pixel column PC1 may include the sub-pixels PX11 to PX41. In the first pixel column PC1, the sub-pixels PX11 to PX41 may be alternately disposed or arranged in an order of the first sub-pixels R and the third sub-pixels B along the second direction DR2, which is a direction of extending the data lines DL1 to DL8 and DLA. For example, the sub-pixels PX11 and PX31 may be the first sub-pixels (R), and the sub-pixels PX21 and PX41 may be the third sub-pixels B.

The second pixel column PC2 may include the sub-pixels PX12 to PX42. In the second pixel column PC2, the sub-pixels PX12 to PX42 may be disposed along the second direction DR2. For example, the sub-pixels PX12 to PX42 may be the second sub-pixels G.

The third pixel column PC3 may include the sub-pixels PX13 to PX43. In the third pixel column PC3, the sub-pixels PX13 to PX43 may be alternately disposed in an order of the third sub-pixels B and the first sub-pixels R along the second direction DR2. For example, the sub-pixels PX13 and PX33 may be the third sub-pixels B, and the sub-pixels PX23 and PX43 may be the first sub-pixels R.

The fourth pixel column PC4 may include the sub-pixels PX14 to PX44. In the fourth pixel column PC4, the sub-pixels PX14 to PX44 may be disposed along the second direction DR2. For example, the sub-pixels PX14 to PX44 may be the second sub-pixels G.

The fifth pixel column PC5 may include the sub-pixels PX15 to PX45, the sixth pixel column PC6 may include the sub-pixels PX16 to PX46, the seventh pixel column PC7 may include the sub-pixels PX17 to PX47, and the eighth pixel column PC8 may include the sub-pixels PX18 to PX48. Arrangements of the sub-pixels PX15 to PX45, PX16 to PX46, PX17 to PX47 and PX18 to PX48 in the fifth, sixth, seventh and eighth pixel columns PC5 to PC8 may be substantially the same as the arrangements of the sub-pixels PX11 to PX41, PX12 to PX42, PX13 to PX43 and PX14 to PX44 in the first, second, third and fourth pixel columns PC1 to PC4, respectively.

Each of the plurality of sub-pixels PX11 to PX48 may include a pixel circuit PXC and a light emitting element LD, as illustrated in FIG. 3B. For convenience of illustration, a sub-pixel PXij that is located on an i-th horizontal line and is connected to a j-th data line DLj may be illustrated in FIG. 3B, where each of i and j is a positive integer. However, the sub-pixel PXij is not limited to the structure illustrated in FIG. 3B, and may have various structures.

The pixel circuit PXC may include a plurality of transistors T1, T2, T3, T4, T5, T6 and T7, and a storage capacitor CST.

The first transistor (or driving transistor) T1 may have a gate electrode connected to a first node N1, a first electrode connected to a second node N2, and a second electrode can be connected to a third node N3. The first transistor T1 may control a driving current Id, which flows from a first power line providing a first power supply voltage VDD to a second power line providing a second power supply voltage VSS via the light emitting element LD, in response to a voltage at the first node N1. For example, the first power supply voltage VDD may be set to have a higher voltage level than the second power supply voltage VSS.

The second transistor T2 may be connected between the j-th data line DLj and the second node N2, and may have a gate electrode connected to the i-th gate line GLi. The second transistor T2 may be turned on in response to a gate-on voltage level of a gate signal supplied to the i-th gate line GLi, and the j-th data line DLj and the second node N2 may be electrically connected when the second transistor T2 is turned on.

The third transistor T3 may be connected between a first electrode of the light emitting element LD (or a fourth node N4) and an initialization line providing an initialization voltage VINT, and may have a gate electrode connected to the i-th gate line GLi. The third transistor T3 may be turned on in response to the gate-on voltage level of the gate signal supplied to the i-th gate line GLi, and the initialization voltage VINT may be provided to the first electrode of the light emitting element LD (or the fourth node N4) when the third transistor T3 is turned on.

The fourth transistor T4 may be connected between the first node N1 and the initialization line, and may have a gate electrode connected to an (i−1)-th gate line GLi−1. The fourth transistor T4 may be turned on by a gate-on voltage level of a gate signal supplied to the (i−1)-th gate line GLi−1, and the initialization voltage VINT may be provided to the first node N1 when the fourth transistor T4 is turned on.

The fifth transistor T5 may be connected between the first power line and the second node N2, and may have a gate electrode connected to an i-th emission control line Ei. The fifth transistor T5 may be turned on by a gate-on voltage level of an emission control signal supplied to the i-th emission control line Ei. For example, the display apparatus may further include an emission driver that generates the emission control signal, and/or the gate driver 300 may further generate/provide the emission control signal.

The sixth transistor T6 may be connected between the second electrode of the first transistor T1 (or the third node N3) and the first electrode of the light emitting element LD (or the fourth node N4), and may have a gate electrode connected to the i-th emission control line Ei. The sixth transistor T6 may be turned on in response to the gate-on voltage level of the emission control signal supplied to the i-th emission control line Ei. Therefore, the fifth transistor T5 and the sixth transistor T6 may be controlled simultaneously.

The seventh transistor T7 may be connected between the second electrode of the first transistor T1 (or the third node N3) and the first node N1, and may have a gate electrode connected to the i-th gate line GLi. The seventh transistor T7 may be turned on in response to the gate-on voltage level of the gate signal supplied to the i-th gate line GLi, and the second electrode of the first transistor T1 and the first node N1 may be electrically connected when the seventh transistor T7 is turned on. In other words, when the seventh transistor T7 is turned on, the first transistor T1 may be connected in a diode structure.

The storage capacitor CST can be connected between the first power line and the first node N1.

The light emitting element LD may have the first electrode (or anode) connected to the fourth node N4, and a second electrode (or cathode) connected to the second power line. The light emitting element LD may generate light with predetermined luminance or brightness in response to the amount of current supplied from the first transistor T1.

In example embodiments, the light emitting element LD may be an organic light emitting diode including an organic light emitting layer. In example embodiments, the light emitting element LD may be an inorganic light emitting element including an inorganic material. For example, the light emitting element LD may have a form in which inorganic light emitting elements are connected in parallel and/or in series between the second power line and the fourth node N4.

In example embodiments, the gate line to which the transistors T2, T3, T4 and T7 are connected may be determined based on various pixel structures. For example, the fourth transistor T4 may be connected to another gate line other than the i-th gate line GLi−1, and may be driven by another gate line. For example, the third transistor T3 may be connected to another gate line other than the i-th gate line GLi, and may be driven by another gate line.

The first data line DL1 may be electrically connected to the third sub-pixels B (e.g., the sub-pixels PX13, PX21, PX33 and PX41) in the first and third pixel columns PC1 and PC3. In other words, the first data line DL1 may be alternately connected to sub-pixels on both sides (e.g., left/right sides) with respect to the first data line DL1, and may be referred to as a third color data line connected to the third sub-pixels B.

The second data line DL2 may be electrically connected to the second sub-pixels G (e.g., the sub-pixels PX12 to PX42) in the second pixel column PC2. In other words, the second data line DL2 may be connected to sub-pixels on one side (e.g., left side) with respect to the second data line DL2, and may be referred to as a second color data line connected to the second sub-pixels G.

The third data line DL3 may be electrically connected to the first sub-pixels R (e.g., the sub-pixels PX15, PX23, PX35 and PX43) in the third and fifth pixel columns PC3 and PC5. In other words, the third data line DL3 may be alternately connected to sub-pixels on both sides with respect to the third data line DL3, and may be referred to as a first color data line connected to the first sub-pixels R.

The fourth data line DL4 may be electrically connected to the second sub-pixels G (e.g., the sub-pixels PX14 to PX44) in the fourth pixel column PC4. As with the second data line DL2, the fourth data line DL4 may be connected to sub-pixels on one side with respect to the fourth data line DL4, and may be referred to as a second color data line connected to the second sub-pixels G.

Connections between the fifth, sixth, seventh and eighth data lines DL5 to DL8 and the sub-pixels may be substantially the same as the connections between the first, second, third and fourth data lines DL1 to DL4 and the sub-pixels, respectively. For example, the fifth data line DL5 may be electrically connected to the sub-pixels PX17, PX25, PX37 and PX45 (e.g., the third sub-pixels B) in the fifth and seventh pixel columns PC5 and PC7, the sixth data line DL6 may be electrically connected to the sub-pixels PX16 to PX46 (e.g., the second sub-pixels G) in the sixth pixel column PC6, the seventh data line DL7 may be electrically connected to the sub-pixels PX27 and PX47 (e.g., the first sub-pixels R) in the seventh pixel column PC7 and other first sub-pixels in a ninth pixel column (not illustrated), and the eighth data line DL8 may be electrically connected to the sub-pixels PX18 to PX48 (e.g., the second sub-pixels G) in the eighth pixel column PC8.

The additional data line DLA may be electrically connected to the first sub-pixels R (e.g., the sub-pixels PX11 and PX31) in the first pixel column PC1. The additional data line DLA may be connected to sub-pixels on one side (e.g., right side) with respect to the additional data line DLA, and may be referred to as a first color data line connected to the first sub-pixels R. The additional data line DLA may also be referred to as a dummy data line.

The sub-pixels PX11 to PX18 may be electrically connected to the first gate line GL1 and may form a first pixel row. Similarly, the sub-pixels PX21 to PX28 may be electrically connected to the second gate line GL2 and may form a second pixel row, the sub-pixels PX31 to PX38 may be electrically connected to the third gate line GL3 and may form a third pixel row, and the sub-pixels PX41 to PX48 may be electrically connected to the fourth gate line GL4 and may form a fourth pixel row.

In the display panel 100*a* of FIGS. 3A and 4, sub-pixels (e.g., PX11 to PX14) of RGBG structure may form one pixel, and a plurality of pixels may be disposed or arranged along the first and second directions DR1 and DR2. FIGS. 3A and 4 illustrate an example where the display panel 100*a* includes thirty two sub-pixels, (e.g., eight pixels), however, the number of sub-pixels and/or pixels may be variously determined according to example embodiments.

In addition, in the display panel 100*a* of FIGS. 3A and 4, connection between sub-pixels and data lines may be implemented with a combination of an alternating structure and a non-alternating structure, and thus, the number of data lines may be greater than the number of pixel columns by one. FIGS. 3A and 4 illustrate an example where the additional data line DLA is located at the leftmost of the display panel 100*a*, however, the additional data line DLA may be located at the rightmost of the display panel according to example embodiments.

The data driver 400*a* may include a plurality of source channels CH1, CH2, CH3, CH4, CH5, CH6, CH7, CH8 and CHA.

The first source channel CH1 may provide a first data voltage corresponding to the third color to the first data line DL1. The second source channel CH2 may provide a second data voltage corresponding to the second color to the second data line DL2. The third source channel CH3 may provide a third data voltage corresponding to the first color to the third data line DL3. The fourth source channel CH4 may provide a fourth data voltage corresponding to the second color to the fourth data line DL4. The fifth source channel CH5 may provide a fifth data voltage corresponding to the third color to the fifth data line DL5. The sixth source channel CH6 may provide a sixth data voltage corresponding to the second color to the sixth data line DL6. The seventh source channel CH7 may provide a seventh data voltage corresponding to the first color to the seventh data line DL7. The eighth source channel CH8 may provide an eighth data voltage corresponding to the second color to the eighth data line DL8. The additional source channel CHA may provide an additional data voltage corresponding to the first color to the additional data line DLA. The additional source channel CHA may be referred to as a dummy source channel.

When the display panel 100*a* has the above-described structure, each of the plurality of source channels CH1 to CH8 and CHA may generate and output a data voltage corresponding to a single color, thereby reducing power consumption.

Figure 5A:
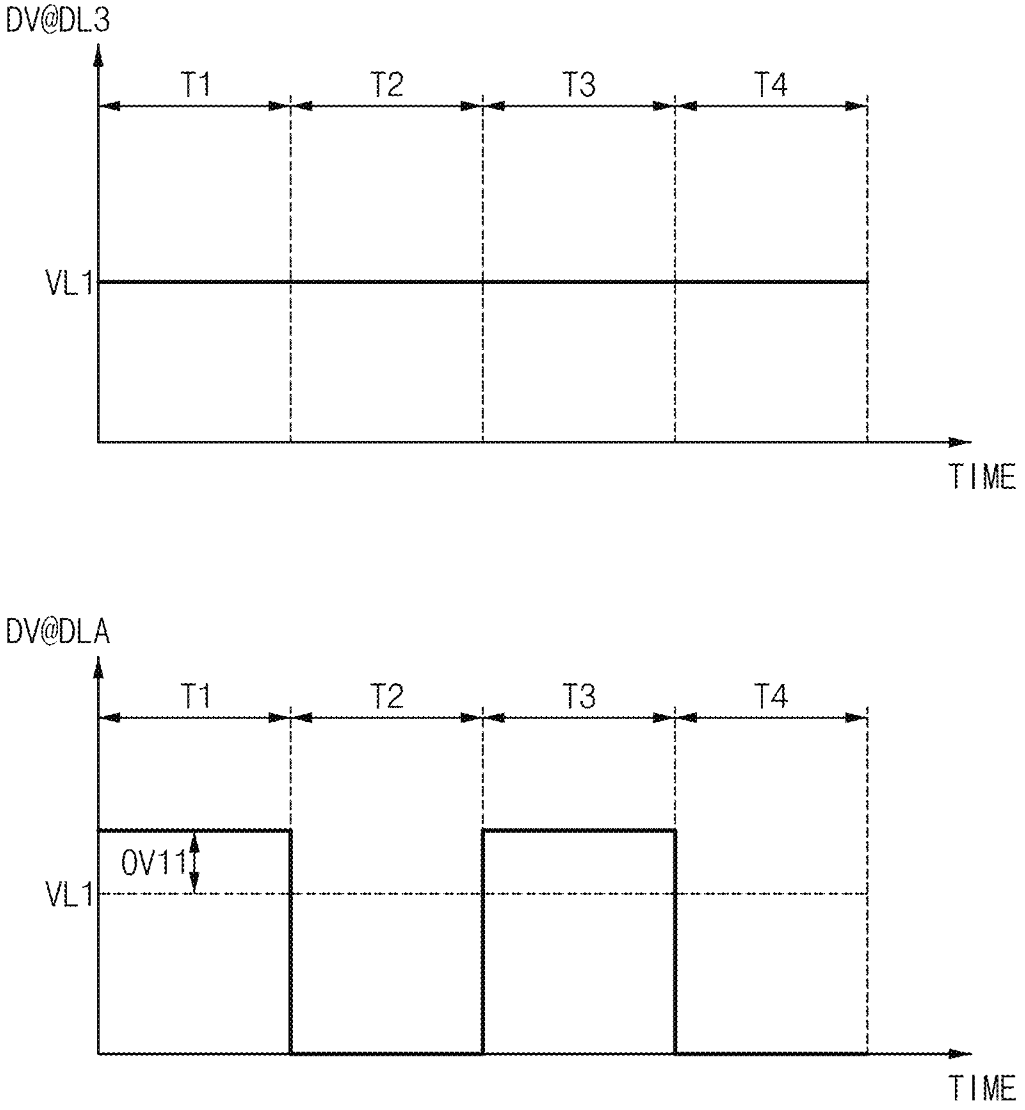
FIGS. 5A, 5B and 5C are diagrams for describing an operation of a display panel and a data driver of FIGS. 3A, 3B and 4.
Figure 5B:
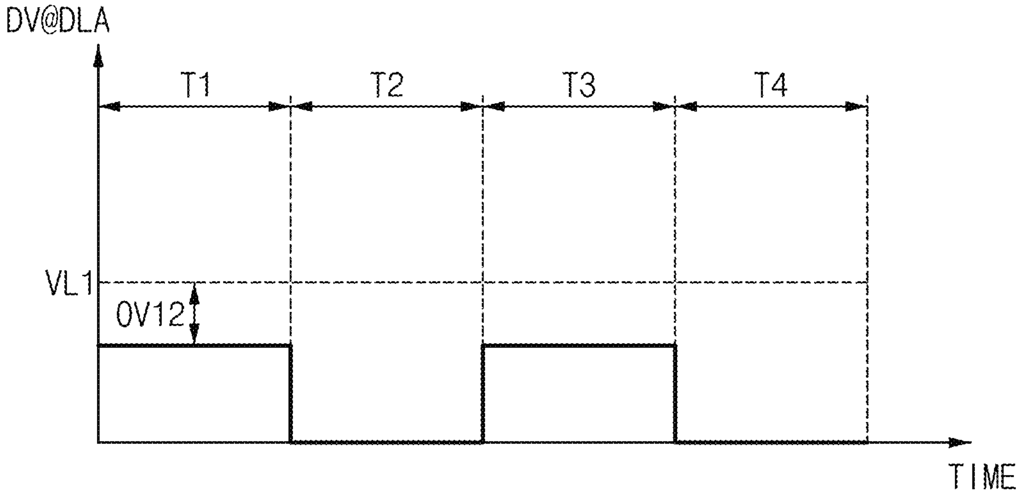
Figure 5C:
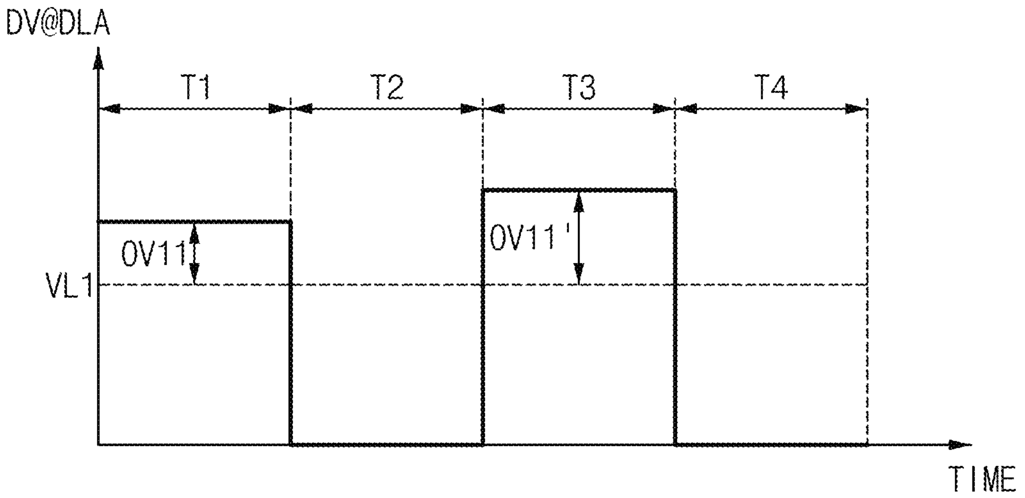

FIGS. 5A, 5B and 5C are diagrams for describing an operation of the display panel 100*a* and the data driver 400*a* of FIGS. 3A, 3B and 4.

Referring to FIGS. 1 and 5A, an example of the change in a data voltage during time intervals T1, T2, T3 and T4 is illustrated. For example, each of the time intervals T1, T2, T3 and T4 may represent one horizontal time interval 1H during which one line image is displayed on a display panel.

When the display panel 100*a* has the structure illustrated in FIGS. 3A, 3B and 4, the channel controller 500 may select the additional source channel CHA among the plurality of source channels CH1 to CH8 and CHA, and may generate the offset signal OFS that includes an offset value OV11 applied to the additional source channel CHA. The data driver 400*a* may adjust a voltage level of an additional data voltage DV@DLA by applying the offset value OV11 to the additional data voltage DV@DLA.

FIG. 5A illustrates an example of a difference in data voltages depending on whether or not the offset value OV11 is applied when an image with the same grayscale is displayed on the display panel 100*a*. For example, a difference in the data voltages DV@DL3 and DV@DLA for the data lines DL3 and DLA connected to the first sub-pixels R with the same color is illustrated.

When the sub-pixels PX15, PX23, PX35 and PX43 connected to the third data line DL3 are driven to have a first grayscale (e.g., the same grayscale), a voltage level of the third data voltage DV@DL3 provided by the third source channel CH3 to the third data line DL3 may have a first voltage level VL1 that is a constant voltage level. For example, the sub-pixel PX15 in the first pixel row may be driven during the time interval T1, the sub-pixel PX23 in the second pixel row may be driven during the time interval T2, the sub-pixel PX35 in the third pixel row may be driven during the time interval T3, and the sub-pixel PX43 in the fourth pixel row can be driven during the time interval T4.

In contrast, when the sub-pixels PX11 and PX31 connected to the additional data line DLA are driven to have the first grayscale, the voltage level of the additional data voltage DV@DLA provided by the additional source channel CHA to the additional data line DLA may have a voltage level in which the offset value OV11 is applied to the first voltage level VL1. For example, the offset value OV11 may be a real number greater than zero. For example, the sub-pixel PX11 in the first pixel row may be driven during the time interval T1, and the sub-pixel PX31 in the third pixel row may be driven during the time interval T3.

Referring to FIGS. 1, 5B and 5C, examples of the change in the additional data voltage DV@DLA during the time intervals T1, T2, T3 and T4 is illustrated. The descriptions repeated with or overlapping with descriptions of FIG. 5A will be omitted in the interest of brevity.

In example embodiments, as illustrated in FIG. 5B, an offset value OV12 that is applied to the additional source channel CHA and the additional data voltage DV@DLA may be a real number less than zero. In other words, not only a positive offset value but also a negative offset value may be applied.

In example embodiments, as illustrated in FIG. 5C, offset values OV11 and OV11' that are applied to the additional source channel CHA and the additional data voltage DV@DLA may be changed depending on positions of the sub-pixels PX11 and PX31 (e.g., depending on the time intervals T1 and T3 and/or depending on horizontal lines). For example, in the time interval T1 driving the sub-pixel PX11 and the corresponding line image, the voltage level of the additional data voltage DV@DLA may have a voltage level in which the offset value OV11 is applied to the first voltage level VL1. For example, in the time interval T3 driving the sub-pixel PX31 and the corresponding line image, the voltage level of the additional data voltage DV@DLA may have a voltage level in which the offset value OV11' that is different from (e.g., greater than) the offset value OV11 is applied to the first voltage level VL1. Although not illustrated in detail, different negative offset values may be applied for different time intervals, and/or positive offset values may be applied for some time intervals and negative offset values may be applied for other time intervals, according to example embodiments.

As described above, when the display panel 100*a* has the structure illustrated in FIGS. 3A, 3B and 4, and when the offset value is applied to the additional source channel CHA (e.g., when offset values are applied differently for channels and/or lines), the load deviation caused by structural differences in data lines may be efficiently compensated.

However, example embodiments are not limited thereto. For example, another offset value may be additionally applied to at least one of the source channels CH1 to CH8 other than the additional source channel CHA. For example, the another offset value applied to another source channel may be different from or substantially the same as the offset value applied to the additional source channel CHA.

Figure 6:
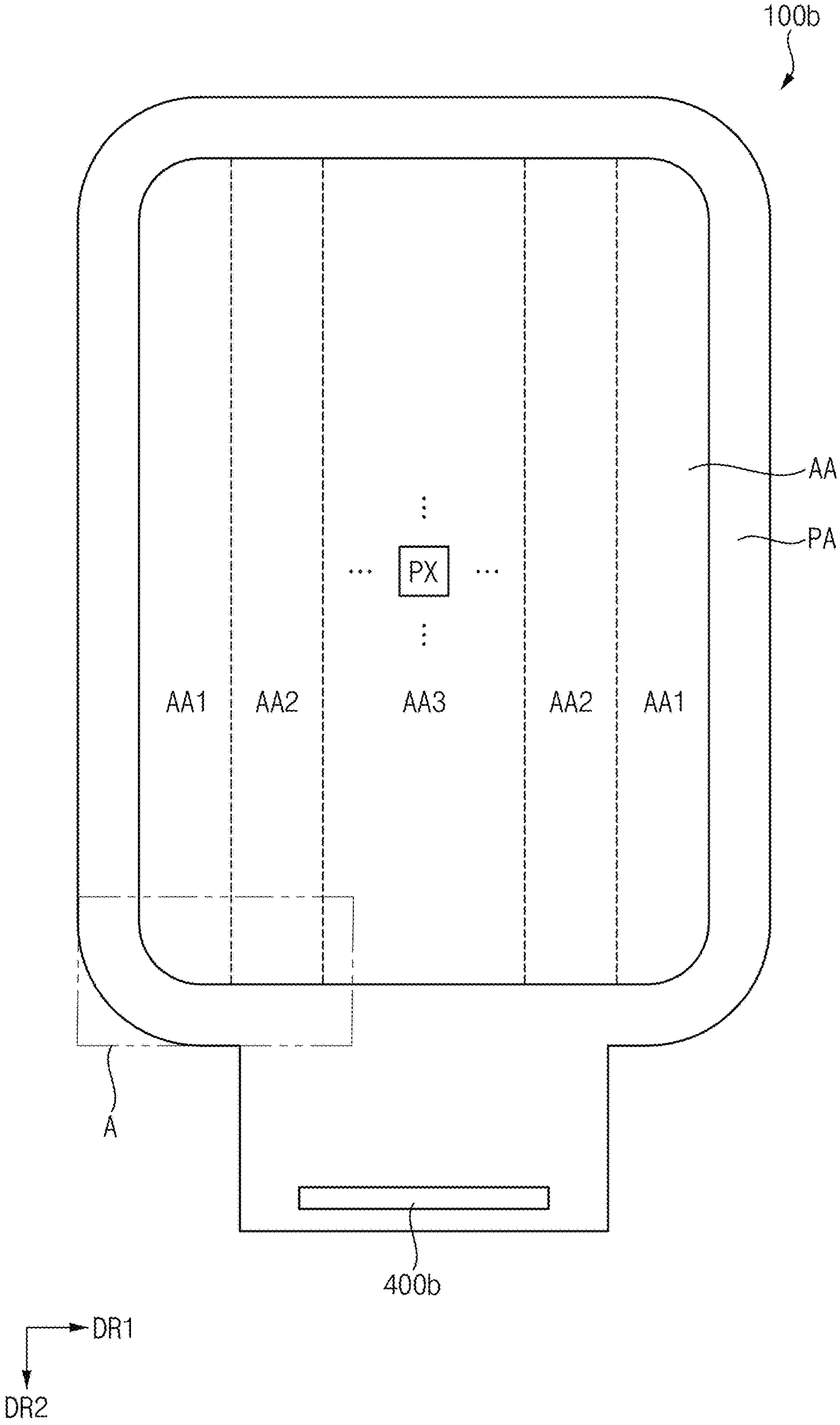
FIGS. 6, 7 and 8 are diagrams illustrating an example of a display panel and a data driver that are included in a display apparatus according to example embodiments.
Figure 7:
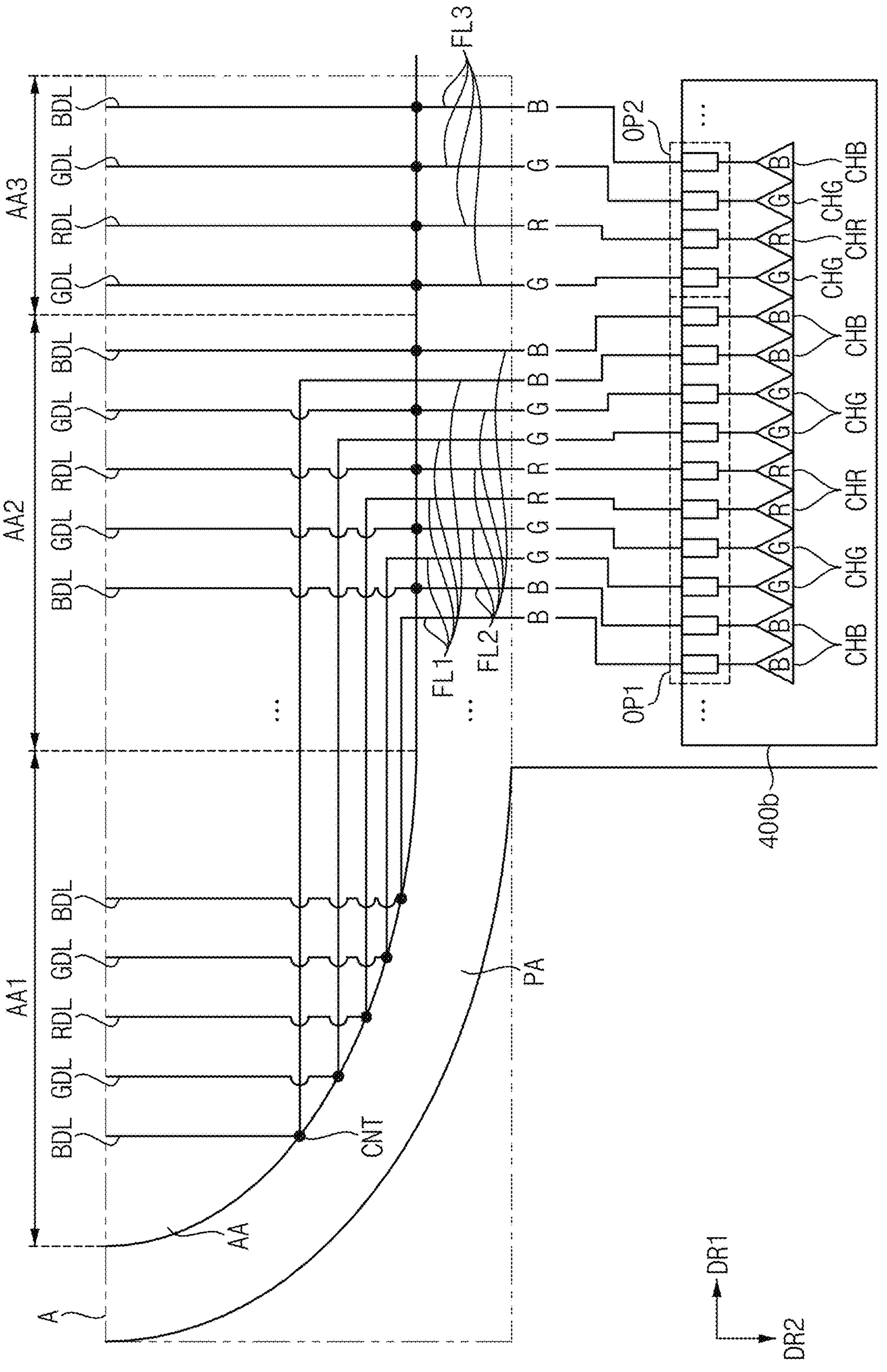
Figure 8:
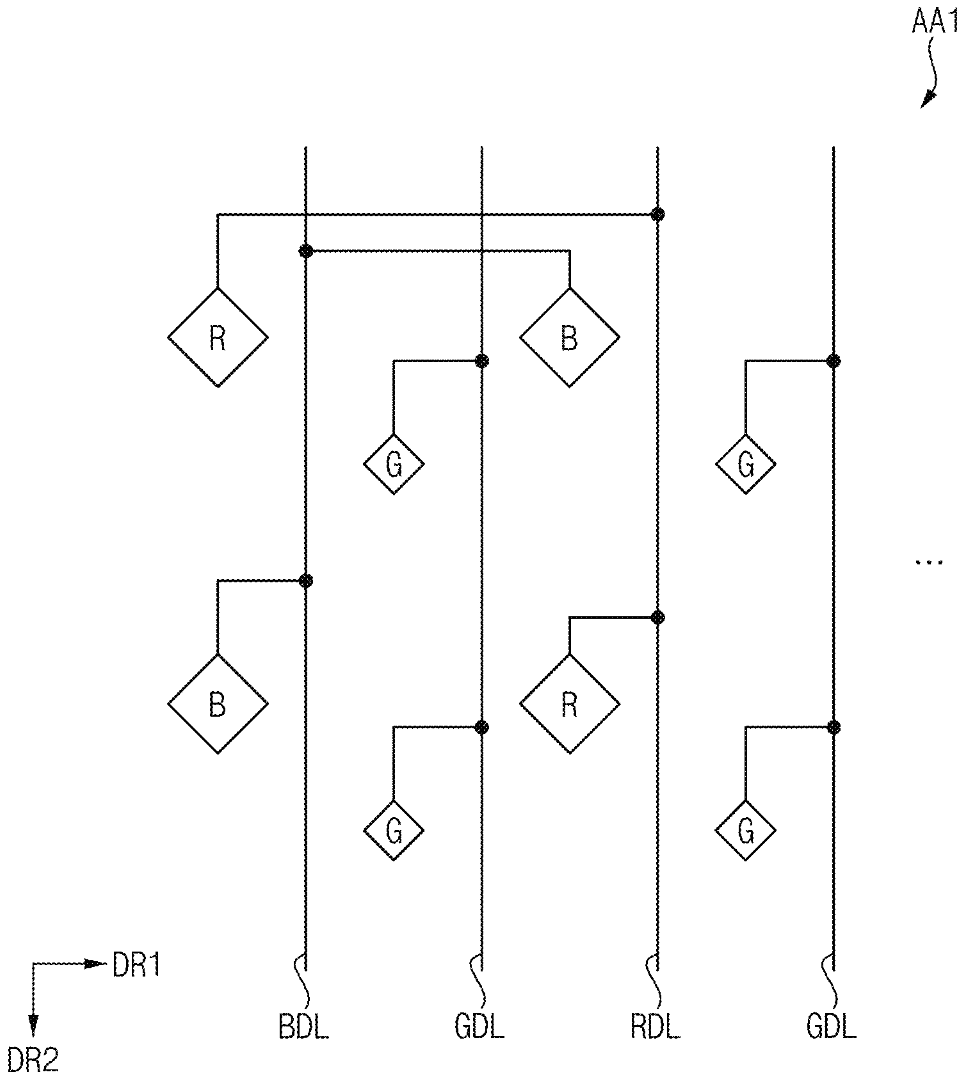

FIGS. 6, 7 and 8 are diagrams illustrating an example of a display panel 100*b* and a data driver 400*b* that are included in a display apparatus according to example embodiments. FIG. 6 is a block diagram illustrating the display panel 100*b* and the data driver 400*b*, FIG. 7 is an enlarged view of a region A in FIG. 6, and FIG. 8 is a block diagram illustrating sub-pixels disposed in a region AA1 in FIG. 6.

Referring to FIGS. 6, 7 and 8, the display panel 100*b* may include a display region AA including the plurality of sub-pixels PX, and a peripheral region PA surrounding the display region AA. For example, the data driver 400*b* may be mounted in the peripheral region PA.

The display region AA may include a first display region AA1, a second display region AA2 disposed adjacent to the first display region AA1 along the first direction DR1, and a third display region AA3 disposed adjacent to the second display region AA2 along the first direction DR1. For example, the first display region AA1 may include an edge region of the display region AA. For example, the edge region of the display region AA may have a curved shape.

The plurality of sub-pixels PX may include the first sub-pixels R displaying the first color, the second sub-pixels G displaying the second color, and the third sub-pixels B displaying the third color. For example, the plurality of sub-pixels PX may be arranged and connected as illustrated in FIG. 8.

The display panel 100*b* may include a plurality of data lines RDL, GDL and BDL. The first data lines RDL may be connected to the first sub-pixels R, the second data lines GDL may be connected to the second sub-pixels G, and the third data lines BDL may be connected to the third sub-pixels B.

At least one of the first data lines RDL and the third data lines BDL may be connected to sub-pixels disposed in different columns and emitting the same color of light. For example, as illustrated in FIG. 8, the third data line BDL may be connected to the third sub-pixels B displaying the third color in different columns, for example, in a first column and a third column.

The arrangements and connections of the above-described sub-pixels R, G and B and the above-described data lines RDL, GDL and BDL may be similar to those described with reference to FIGS. 3A, 3B and 4, except that the additional data line DLA is omitted.

The display panel 100*b* may include a plurality of fan-out lines FL1, FL2 and FL3. The first fan-out lines FL1 may be connected to data lines RDL, GDL and BDL that are connected to sub-pixels disposed in the first display region AA1. The second fan-out lines FL2 may be connected to data lines RDL, GDL and BDL that are connected to sub-pixels disposed in the second display region AA2. The first fan-out lines FL1 and the second fan-out lines FL2 may be alternately disposed in the peripheral region PA. The third fan-out lines FL3 may be connected to data RDL, GDL and BDL that are connected to sub-pixels disposed in the third display region AA3.

The first fan-out lines FL1 may be connected to the data lines RDL, GDL and BDL via the display region AA and the peripheral region PA. In other words, the first fan-out lines FL1 may be disposed on the display region AA and the peripheral region PA. For example, the first fan-out lines FL1 and the data lines RDL, GDL and BDL disposed in the first display region AA1 may be disposed on different layers, and may contact each other through a contact hole CNT.

The second fan-out lines FL2 and the third fan-out lines FL3 may be connected to the data lines RDL, GDL and BDL via the peripheral region PA. For example, the second fan-out lines FL2 and the data lines RDL, GDL and BDL disposed in the second display region AA2 may be disposed on different layers, and may contact each other through the contact hole CNT. For example, the third fan-out lines FL3 and the data lines RDL, GDL and BDL disposed in the third display region AA3 may be disposed on different layers, and may contact each other through the contact hole CNT.

The data driver 400*b* may include a plurality of source channels CHR, CHG and CHB. The first source channels CHR may provide first data voltages corresponding to the first color to the first data lines RDL, the second source channels CHG may provide second data voltages corresponding to the second color to the second data lines GDL, and the third source channels CHB may provide third data voltages corresponding to the third color to the third data lines BDL.

The data driver 400*b* may include first output pads OP1 and second output pads OP2. The first output pads OP1 may output data voltages to the first fan-out lines FL1 and second fan-out lines FL2, and the second output pads OP2 may output data voltages to the third fan-out lines FL3.

When the display panel 100*b* has the above-described structure, the data lines RDL, GDL and BDL in the first display region AA1 and the plurality of source channels CHR, CHG and CHB may be connected to each other through first fan-out lines FL1, thereby reducing a dead space (e.g., the peripheral region PA).

In example embodiments, a source output remapping may be performed on at least some of the plurality of source channels CHR, CHG and CHB. In other words, the output image data DAT may be generated by remapping the input image data IDAT such that an arrangement of data voltages based on the output image data DAT may be different from an arrangement of data voltages based on the input image data IDAT. For example, depending on the structure of the sub-pixels PX, the arrangement of the data lines RDL, GDL and BDL, and the arrangement of the fan-out lines FL1, FL2 and FL3, the data driver 400*b* may output remapped data voltages to remapped source channels on which the source output remapping is performed. For example, the remapped source channels may be at least some of the plurality of source channels CHR, CHG and CHB.

For example, the first and second fan-out lines FL1 and FL2 may be repeatedly connected to the data lines RDL, GDL and BDL with a first arrangement, and the third fan-out lines FL3 may be repeatedly connected to the data lines RDL, GDL and BDL with a second arrangement, which is different from the first arrangement. The data driver 400*b* may output the data voltages to the first and second fan-out lines FL1 and FL2 depending on the first arrangement, and may output the data voltages to the third fan-out lines FL3 depending on the second arrangement. For example, the first arrangement may be GGRRGGBB, and the second arrangement may be GRGB, but example embodiments are not limited thereto. Since the first fan-out lines FL1 and the data lines RDL, GDL and BDL are disposed on different layers, and since the first fan-out lines FL1 are connected to the data lines RDL, GDL and BDL via the display region AA, the first and second fan-out lines FL1 and FL2 may be alternately disposed and may cross the data lines RDL, GDL and BDL in the display region AA. Therefore, although the sub-pixels have the RGBG structure, the first arrangement may be composed of eight colors of GGRRGGBB.

Here, eight colors do not mean eight kinds of colors. The timing controller 200 may remap the input image data IDAT based on the first arrangement and the second arrangement to generate the output image data DAT, and may control the data driver 400*b* to output the remapped data voltages for the remapped source channels.

Figure 10A:
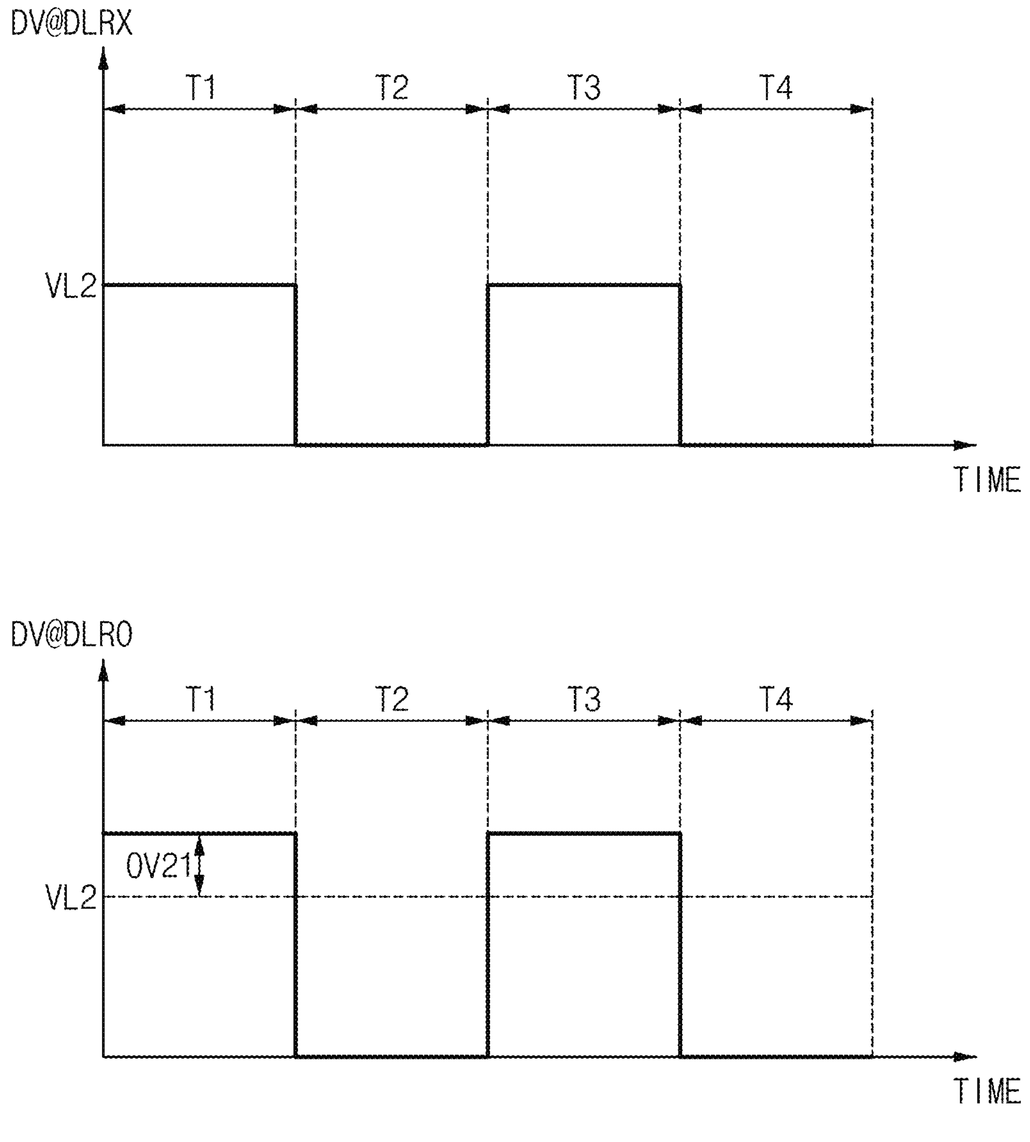
Figure 10B:
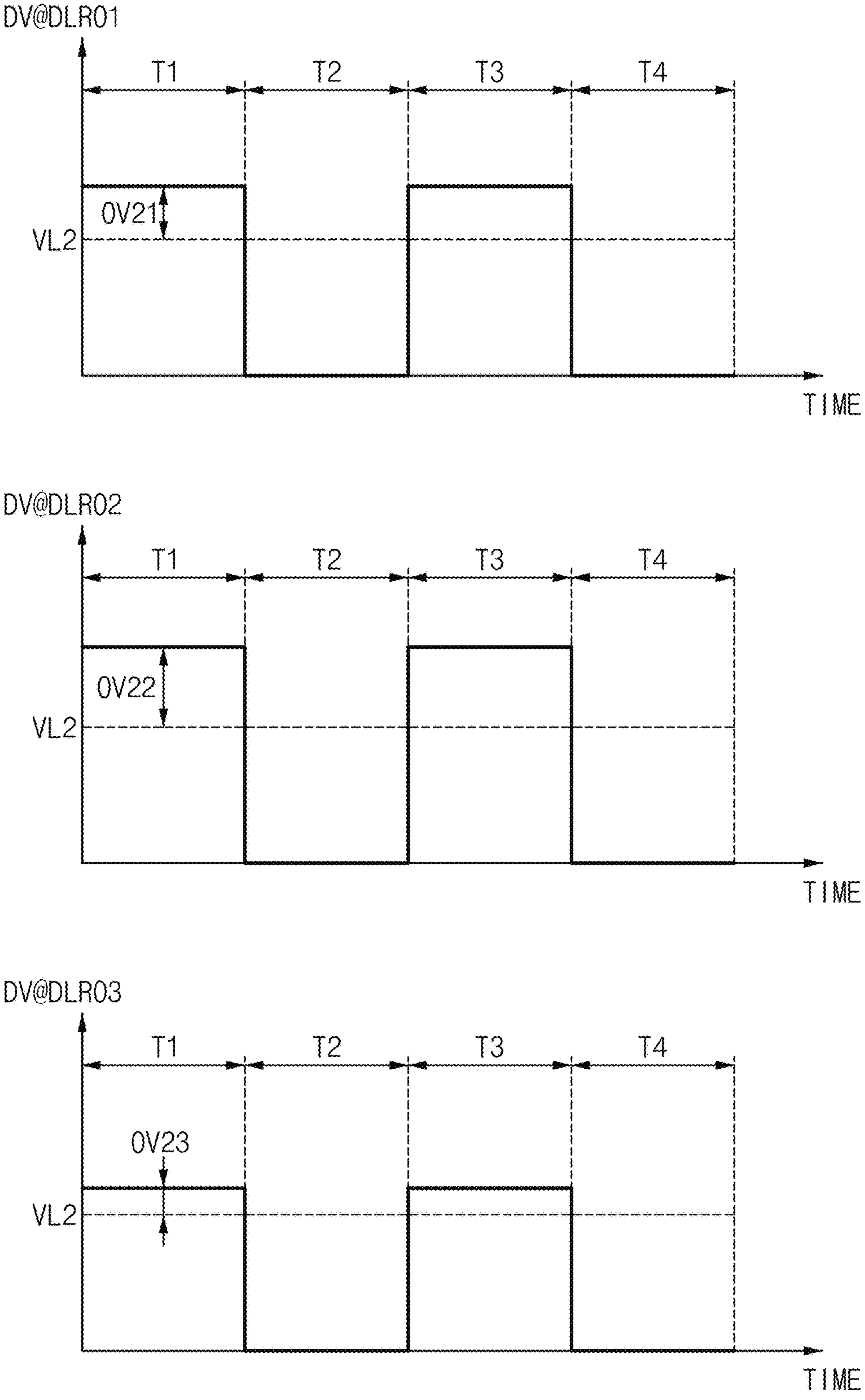

FIGS. 9, 10A and 10B are diagrams for describing an operation of the display panel 100*b* and the data driver 400*b* of FIGS. 6, 7 and 8.

Referring to FIG. 9, an example where the source output remapping is not performed is illustrated as CASE1, and an example where the source output remapping is performed is illustrated as CASE2.

In the example CASE1 where the source output remapping is not performed, all outputs S1, S2, S3, . . . , S80, S81, S82, S83, S84, . . . , S877, S878, S879, S880, S881, . . . , S1078, S1079 and S1080 of first to 1080th source channels may not be changed and may be maintained.

In the example CASE2 where the source output remapping is performed, outputs of some source channels may not be changed and may be maintained, and outputs of other source channels may be changed. For example, an arrangement of the outputs S1 to S80 of the first to 80th source channels and an arrangement of the outputs S881 to S1080 of the 881st to 1080th source channels may be the same in CASE1 and CASE2. For example, an arrangement of the outputs S81 to S880 of the 81st to 880th source channels may be different in CASE1 and CASE2. In other words, in CASE2, the 81st to 880th source channels may be the remapped source channels on which the source output remapping is performed.

However, example embodiments are not limited thereto. For example, the total number of source channels, the number of remapped source channels, the arrangement of outputs when the source output remapping is performed, etc. may be variously determined according to example embodiments.

Referring to FIGS. 1 and 10A, an example of the change in a data voltage during the time intervals T1, T2, T3 and T4 is illustrated. The descriptions repeated with or overlapping with descriptions of FIGS. 5A, 5B and 5C will be omitted in the interest of brevity.

When the display panel 100*b* has the structure illustrated in FIGS. 6, 7 and 8, the channel controller 500 may select the remapped source channels (e.g., the 81st to 880th source channels in FIG. 9) on which the source output remapping is performed among the plurality of source channels CHR, CHG and CHB, and may generate the offset signal OFS that includes an offset value OV21 applied to the remapped source channels. The data driver 400*b* may adjust voltage levels of the remapped data voltages by applying the offset value OV21 to the remapped data voltage output by the remapped source channels.

FIG. 10A illustrates an example of a difference in data voltages depending on whether or not the offset value OV21 is applied (e.g., whether or not the source output remapping is performed) when an image with the same grayscale is displayed on the display panel 100*b*.

A voltage level of a data voltage DV@DLRX that is provided to a data line connected to a source channel on which the source output remapping is not performed may have a second voltage level VL2. In contrast, a voltage level of a remapped data voltage DV@DLRO that is provided to a data line connected to the remapped source channel may have a voltage level in which the offset value OV21 is applied to the second voltage level VL2.

Referring to FIGS. 1 and 10B, examples of the change in remapped data voltages DV@DLRO1, DV@DLRO2 and DV@DLRO3 during the time intervals T1, T2, T3 and T4 is illustrated.

In example embodiments, offset values OV21, OV22 and OV23 that are applied to the remapped source channels may be changed depending on positions of the remapped source channels. For example, the offset value OV21 that is applied to the first remapped data voltage DV@DLRO1 provided by a first remapped source channel, the offset value OV22 that is applied to the second remapped data voltage DV@DLRO2 provided by a second remapped source channel, and the offset value OV23 that is applied to the third remapped data voltage DV@DLRO3 provided by a third remapped source channel may be different from each other. The offset values OV21, OV22 and OV23 may be variously determined according to example embodiments. In example embodiments, the offset values OV21, OV22 and OV23 may be changed depending on positions, time intervals and/or horizontal lines, as describe with reference to FIG. 5C.

As described above, when the display panel 100*b* has the structure illustrated in FIGS. 6, 7 and 8, and when the offset value is applied to the remapped source channels (e.g., when offset values are applied differently for channels and/or lines), the load deviation may be efficiently compensated.

However, example embodiments are not limited thereto. For example, another offset value may be additionally applied to at least one of the source channels other than the remapped source channels. For example, the another offset value applied to another source channel may be different from or substantially the same as the offset value applied to the remapped source channels.

Figure 11:
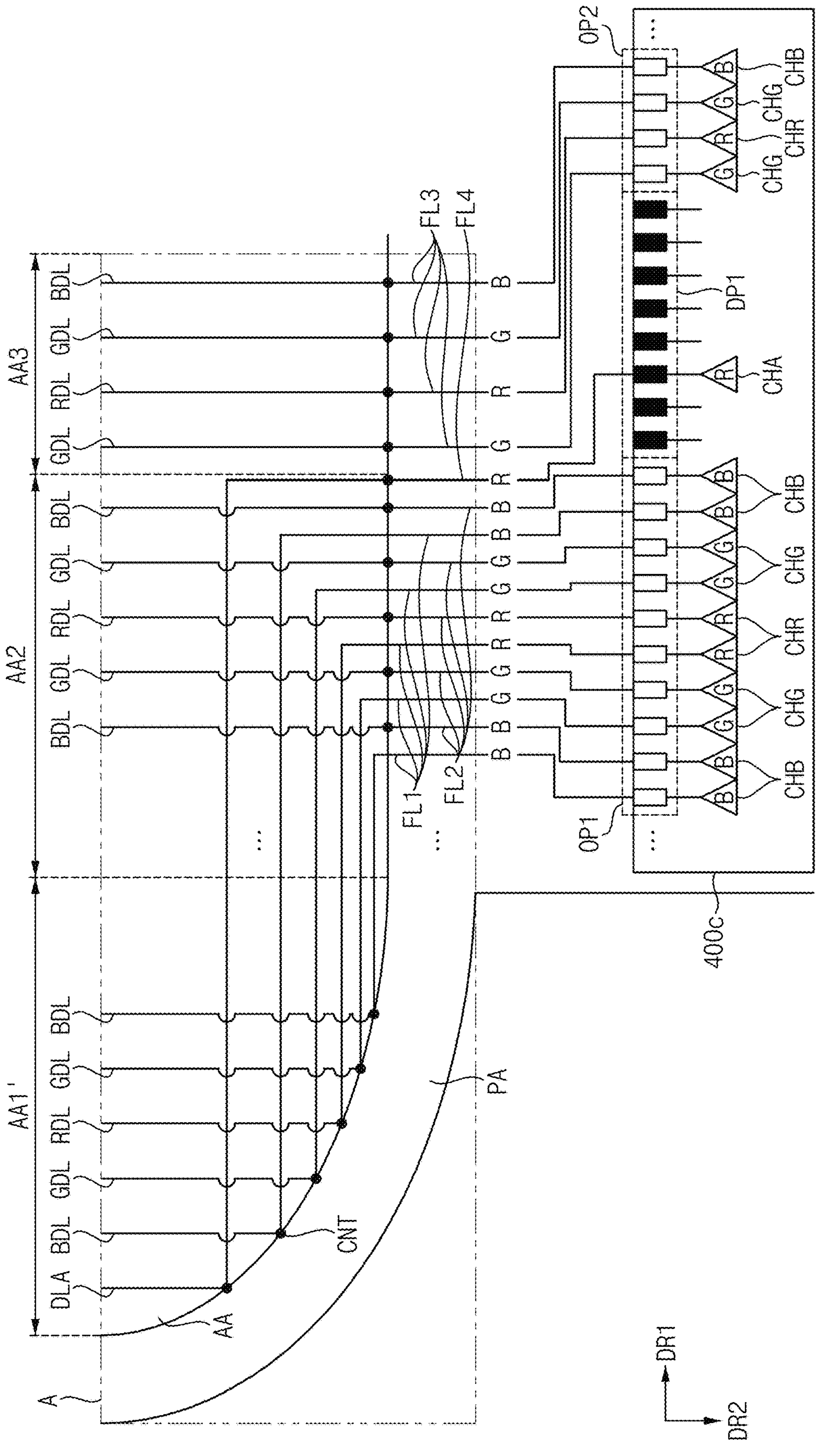
FIGS. 11 and 12 are diagrams illustrating an example of a display panel and a data driver that are included in a display apparatus according to example embodiments.
Figure 12:
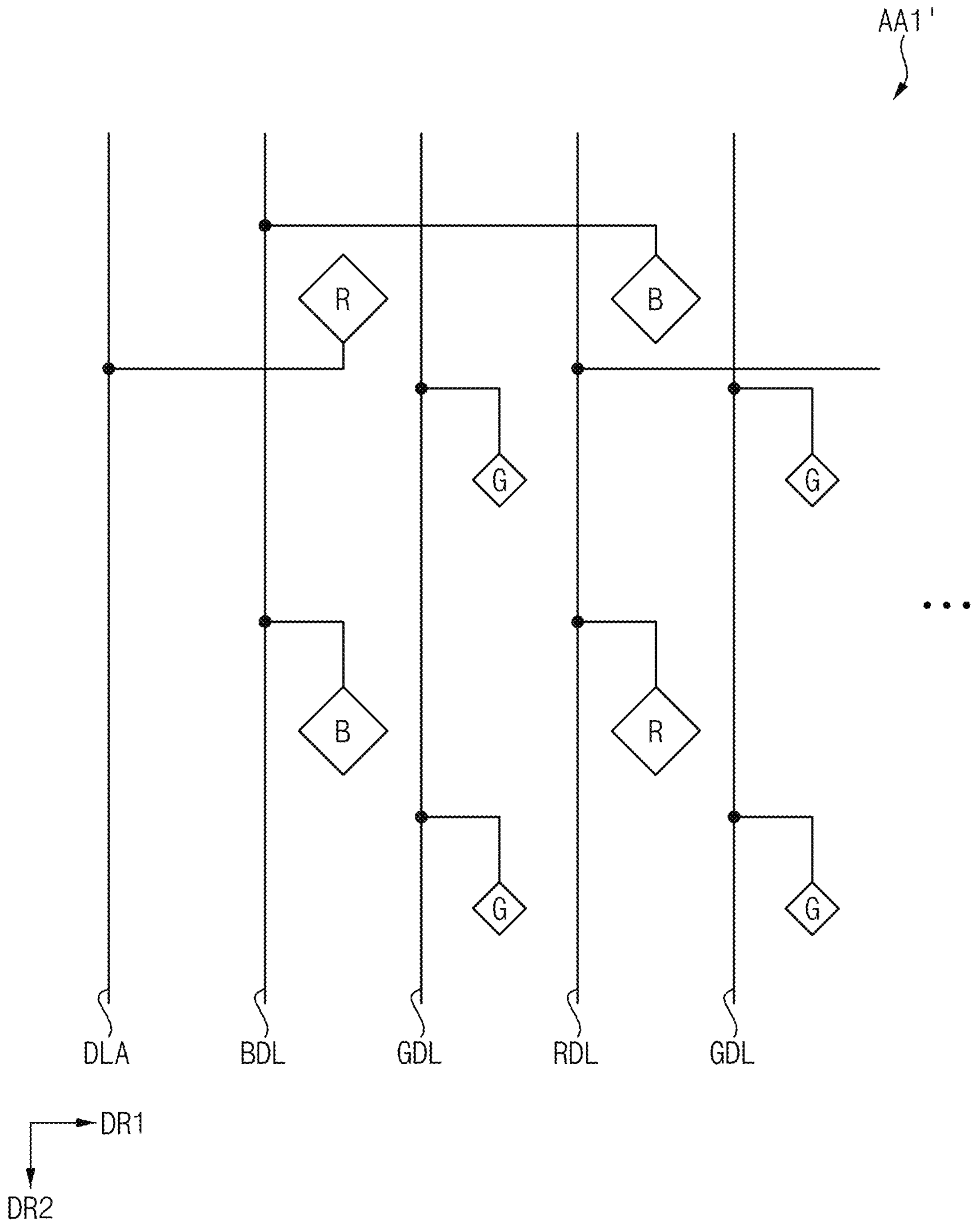

FIGS. 11 and 12 are diagrams illustrating an example of a display panel and a data driver 400*c* that are included in a display apparatus according to example embodiments. The descriptions repeated with or overlapping with descriptions of FIGS. 6, 7 and 8 will be omitted in the interest of brevity.

Referring to FIGS. 11 and 12, a structure of FIGS. 11 and 12 may be substantially the same as the structure of FIGS. 6, 7 and 8, except that a display panel in FIGS. 11 and 12 further includes an additional data line DLA in a first display region AA1' and a fourth fan-out line FL4 connected to the additional data line DLA, and except that the data driver 400*c* in FIG. 11 further includes an additional source channel CHA connected to the additional data line DLA and the fourth fan-out line FL4 and first dummy pads DP1. The additional data lines DLA and the additional source channel CHA may be substantially the same as those described with reference to FIGS. 3A, 3B and 4.

The structure of FIGS. 11 and 12 may be implemented by combining the structure of FIGS. 3A, 3B and 4 and the structure of FIGS. 6, 7 and 8. Therefore, each source channel may generate and output a data voltage corresponding to a single color, thereby reducing power consumption. In addition, the data lines in the first display region AA1' and the plurality of source channels may be connected to each other through first fan-out lines FL1, thereby reducing a dead space.

When the display panel has the structure illustrated in FIGS. 11 and 12, the channel controller 500 may select the additional source channel CHA and the remapped source channels (e.g., the 81st to 880th source channels in FIG. 9), and may generate the offset signal OFS that includes offset values applied to the additional source channel CHA and the remapped source channels. The data driver 400*c* may adjust voltage levels of data voltages by applying the offset values to the data voltages output by the additional source channel CHA and the remapped source channels.

Figure 13:
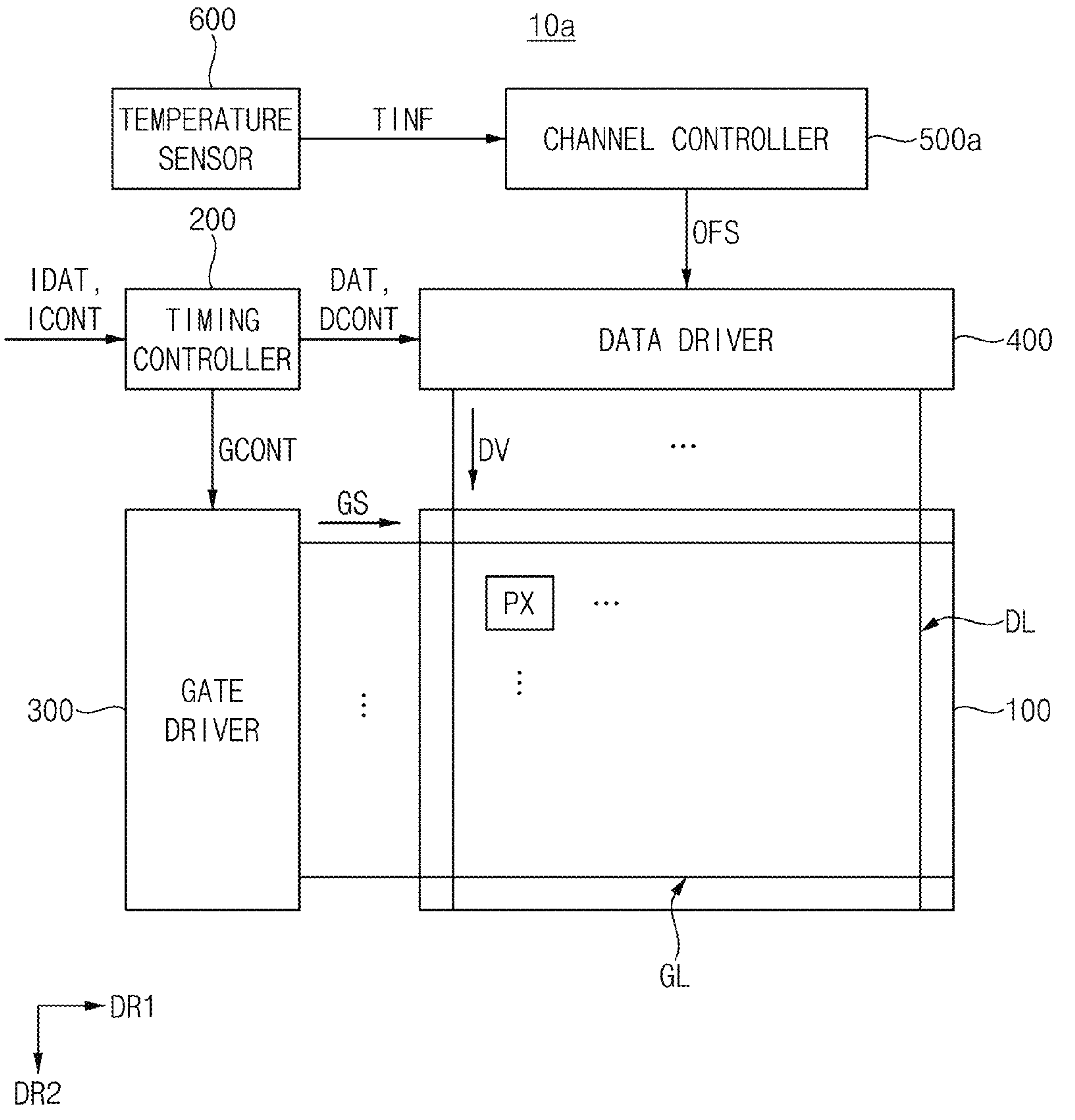
FIG. 13 is a block diagram illustrating a display apparatus according to example embodiments.
Figure 14A:
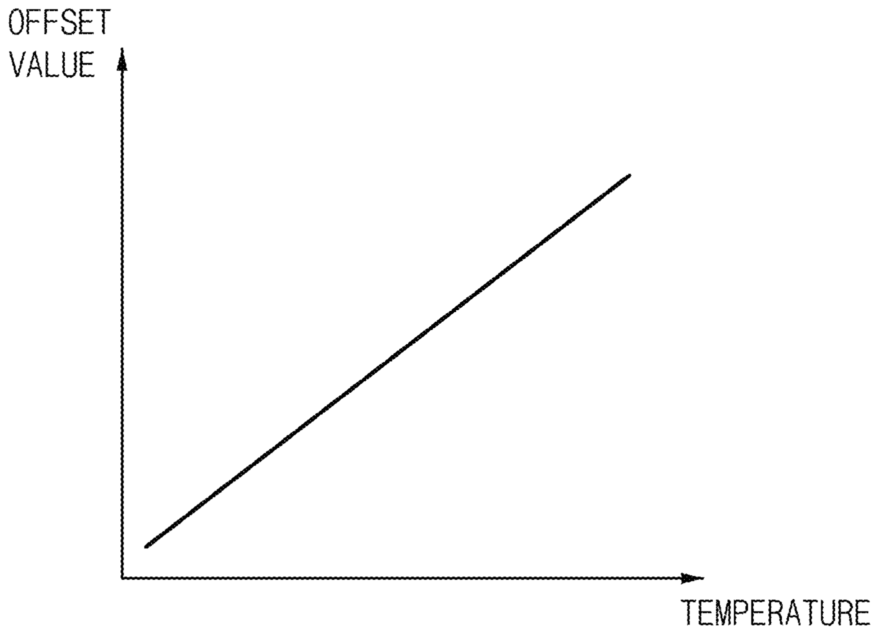
FIGS. 14A and 14B are diagrams for describing an operation of a display apparatus of FIG. 13.
Figure 14B:
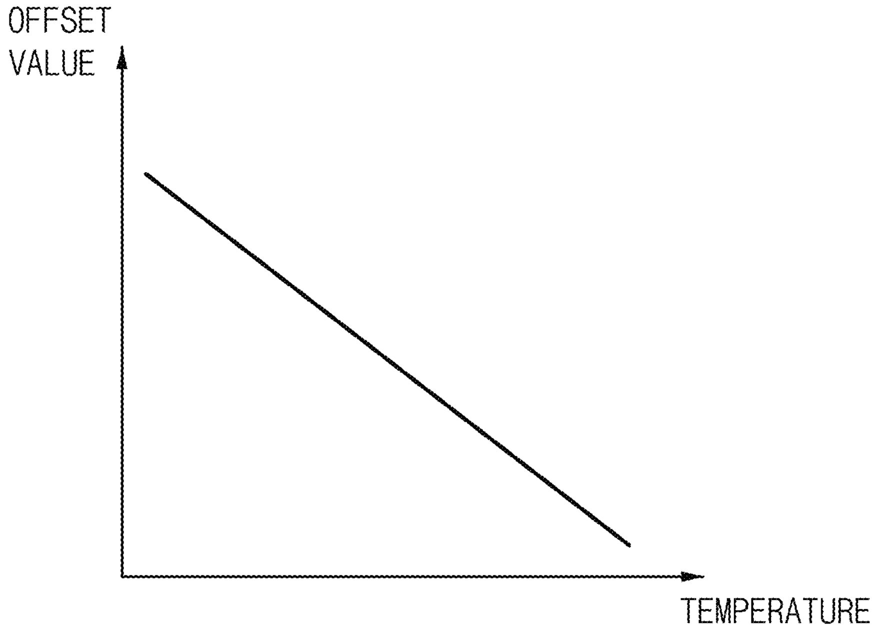

FIG. 13 is a block diagram illustrating a display apparatus 10*a* according to example embodiments. FIGS. 14A and 14B are diagrams for describing an operation of the display apparatus 10*a* of FIG. 13.

Referring to FIG. 13, the display apparatus 10*a* includes a display panel 100, a data driver 400 and a channel controller 500*a*. The display apparatus 10*a* may further include a timing controller 200, a gate driver 300 and a temperature sensor 600.

The display device 10*a* of FIG. 13 may be substantially the same as the display device 10 of FIG. 1, except that the display device 10*a* further includes the temperature sensor 600 and an operation of the channel controller 500*a* is partially changed.

The temperature sensor 600 may detect or sense an operating temperature, and may generate temperature information TINF representing or indicating the operating temperature.

The channel controller 500*a* may further select at least one selected source channel based on the temperature information TINF, and may further generate a second offset value for the at least one selected source channel. For example, the at least one selected source channel may be a channel other than the additional source channel CHA described with reference to FIG. 4 and/or the remapped source channels described with reference to FIG. 9. The data driver 400 may further adjust a voltage level of a selected data voltage provided by the at least one selected source channel by applying the second offset value to the selected data voltage.

Referring to FIGS. 14A and 14B, examples of the change in an offset value depending on the operating temperature are illustrated.

In example embodiments, as illustrated in FIG. 14A, as the operating temperature increases, the second offset value applied to the at least one selected source channel may increase. In example embodiments, as illustrated in FIG. 14B, as the operating temperature increases, the second offset value applied to the at least one selected source channel may decrease. However, example embodiments are not limited thereto, and a relationship between the operating temperature and the second offset value may be variously determined according to example embodiments.

Figure 15:
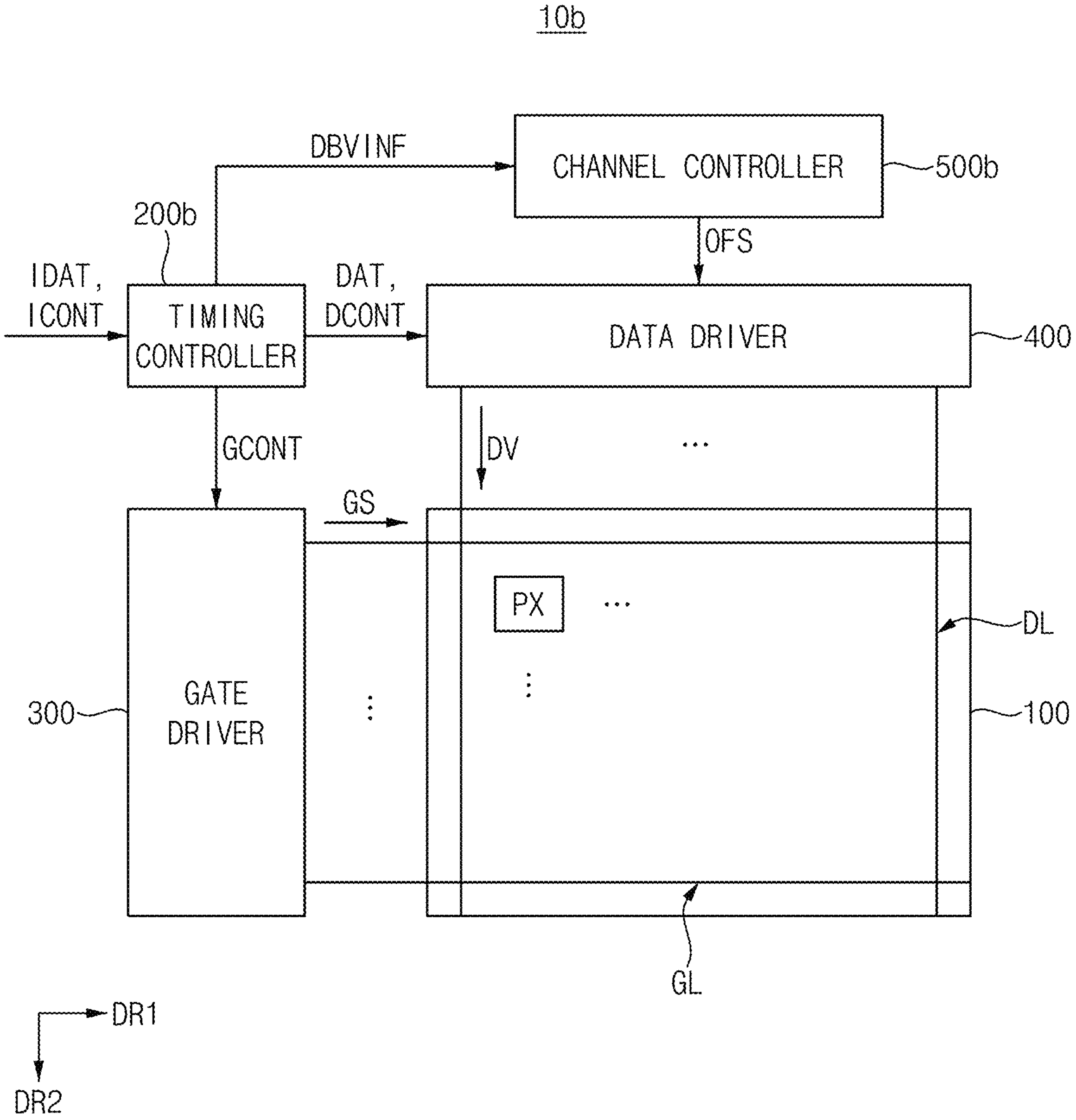
FIG. 15 is a block diagram illustrating a display apparatus according to example embodiments.
Figure 16A:
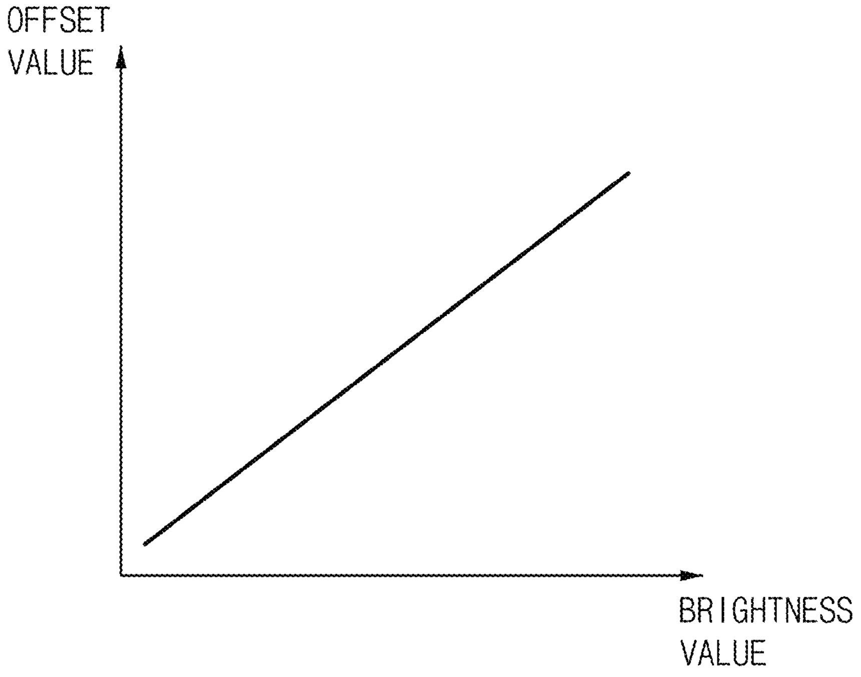
FIGS. 16A and 16B are diagrams for describing an operation of a display apparatus of FIG. 15.
Figure 16B:
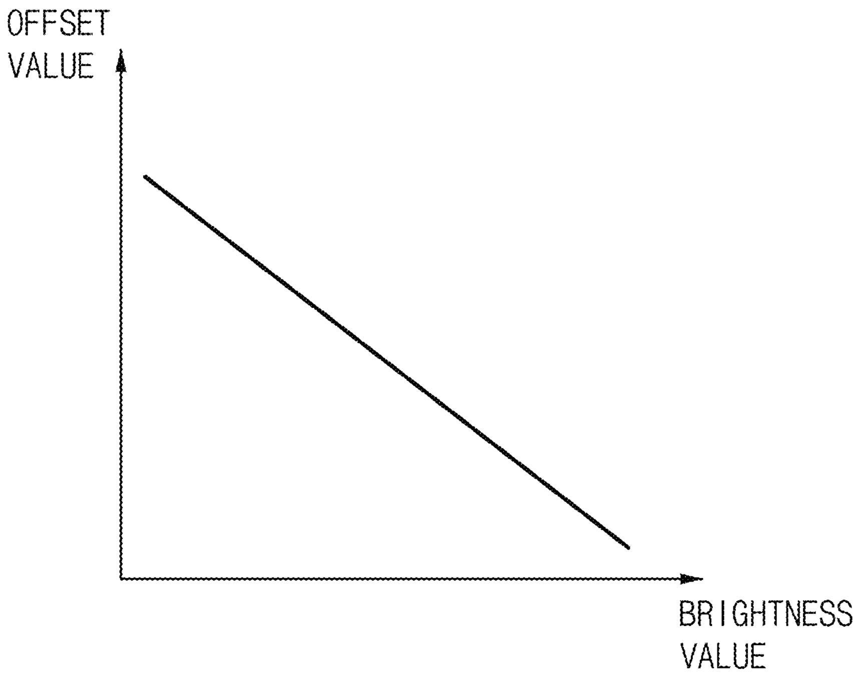

FIG. 15 is a block diagram illustrating a display apparatus 10*b* according to example embodiments. FIGS. 16A and 16B are diagrams for describing an operation of the display apparatus 10*b* of FIG. 15.

Referring to FIG. 15, the display apparatus 10*b* includes a display panel 100, a data driver 400 and a channel controller 500*b*. The display apparatus 10*b* may further include a timing controller 200*b* and a gate driver 300.

The display device 10*b* of FIG. 15 may be substantially the same as the display device 10 of FIG. 1, except that operations of the timing controller 200*b* and the channel controller 500*b* are partially changed.

The timing controller 200*b* may further provide luminance information DBVINF representing luminance of an image displayed on the display panel 100.

The channel controller 500*b* may further select at least one selected source channel based on the luminance information DBVINF, and may further generate a second offset value for the at least one selected source channel. For example, the at least one selected source channel may be a channel other than the additional source channel CHA described with reference to FIG. 4 and/or the remapped source channels described with reference to FIG. 9. The data driver 400 may further adjust a voltage level of a selected data voltage provided by the at least one selected source channel by applying the second offset value to the selected data voltage.

Referring to FIGS. 16A and 16B, examples of the change in an offset value depending on the luminance are illustrated.

In example embodiments, as illustrated in FIG. 16A, as the luminance of the image increases, the second offset value applied to the at least one selected source channel may increase. In example embodiments, as illustrated in FIG. 16B, as the luminance of the image increases, the second offset value applied to the at least one selected source channel may decrease. However, example embodiments are not limited thereto, and a relationship between the luminance of the image and the second offset value may be variously determined according to example embodiments.

Figure 17:
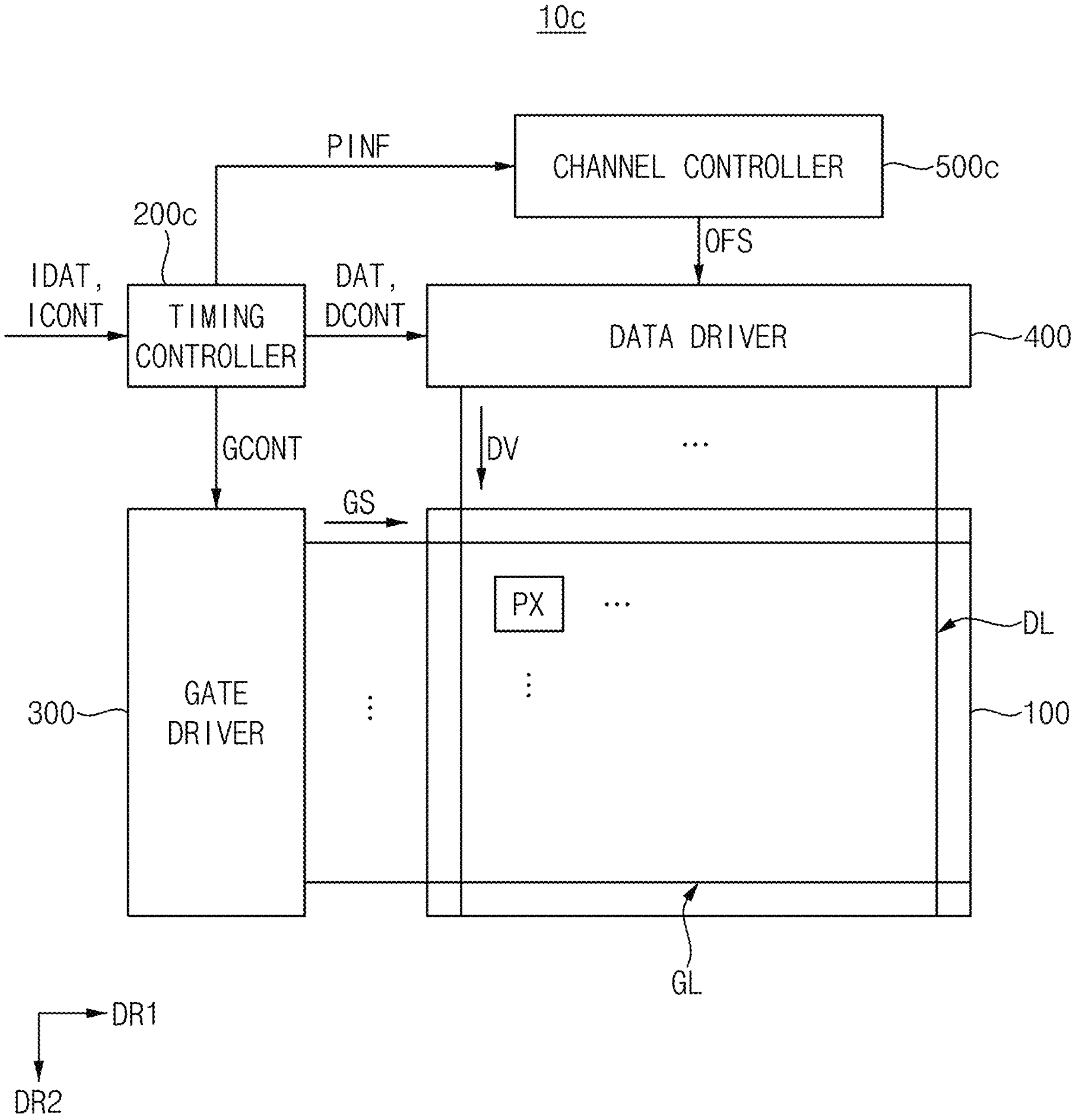
FIG. 17 is a block diagram illustrating a display apparatus according to example embodiments.

FIG. 17 is a block diagram illustrating a display apparatus 10*c* according to example embodiments. FIGS. 18A, 18B, 18C and 18D are diagrams for describing an operation of the display apparatus 10*c* of FIG. 17.

Referring to FIG. 17, the display apparatus 10*c* includes a display panel 100, a data driver 400 and a channel controller 500*c*. The display apparatus 10*c* may further include a timing controller 200*c* and a gate driver 300.

The display device 10*c* of FIG. 17 may be substantially the same as the display device 10 of FIG. 1, except that operations of the timing controller 200*c* and the channel controller 500*c* are partially changed.

The timing controller 200*c* may provide position information PINF associated with or related to positions of the plurality of source channels.

The channel controller 500*c* may further select at least one selected source channel based on the position information PINF, and may further generate a second offset value for the at least one selected source channel. For example, the at least one selected source channel may be a channel other than the additional source channel CHA described with reference to FIG. 4 and/or the remapped source channels described with reference to FIG. 9. The data driver 400 may further adjust a voltage level of a selected data voltage provided by the at least one selected source channel by applying the second offset value to the selected data voltage.

Figure 18A:
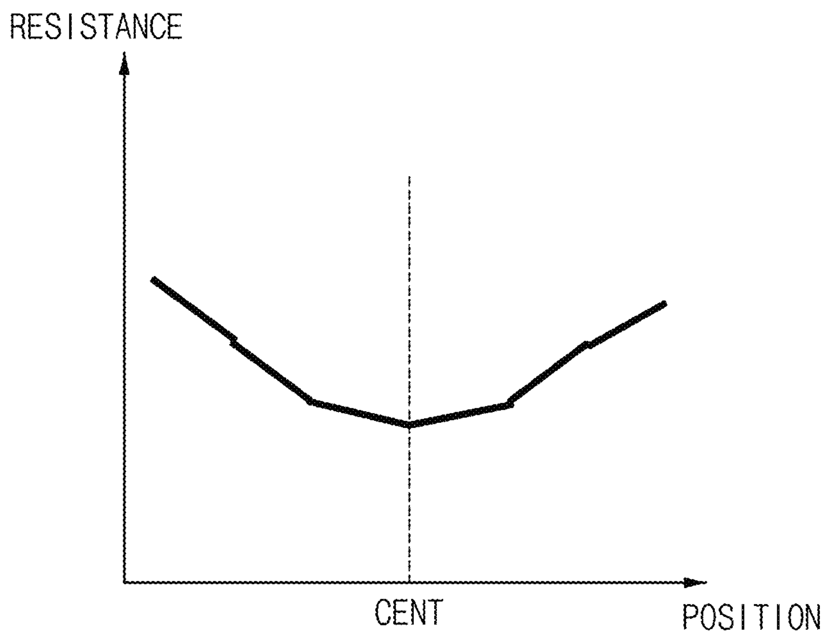
FIGS. 18A, 18B, 18C and 18D are diagrams for describing an operation of a display apparatus of FIG. 17.
Figure 18B:
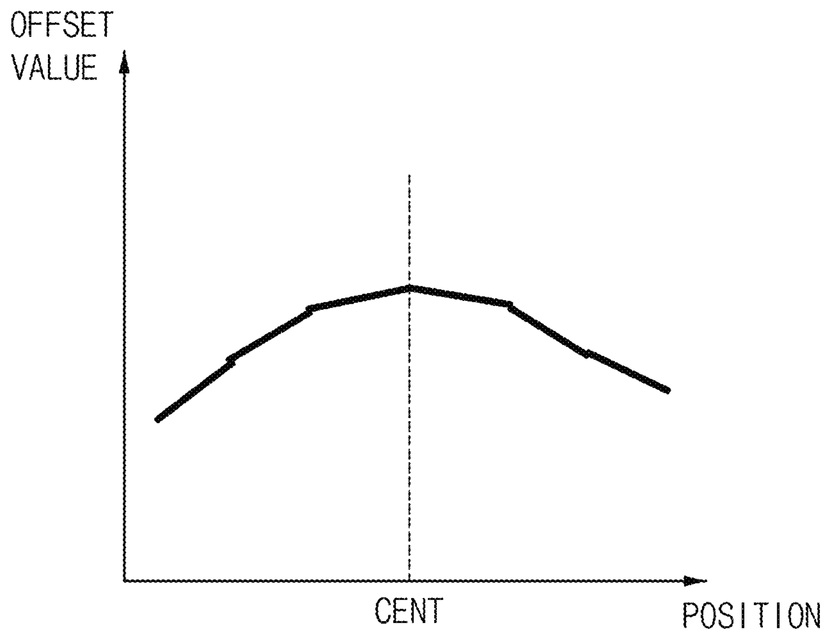

Referring to FIGS. 18A and 18B, examples of the changes in a resistance and an offset value depending on the position in the display panel 100 are illustrated.

In example embodiments, as illustrated in FIG. 18A, as the position approaches a center CENT of the display panel 100, the resistance may decrease due to the characteristics of the manufacturing process. In this example, as illustrated in FIG. 18B, a relatively large offset value may be applied to a source channel relatively close to the center CENT of the display panel 100, and a relatively small offset value may be applied to a source channel that is relatively far from the center CENT of the display panel 100 (e.g., relatively close to an edge of the display panel 100). For example, among the plurality of source channels, a source channel connected to sub-pixels disposed at the center CENT of the display panel 100 may be selected as the at least one selected source channel, and the second offset value may be applied for the at least one selected source channel.

Figure 18C:
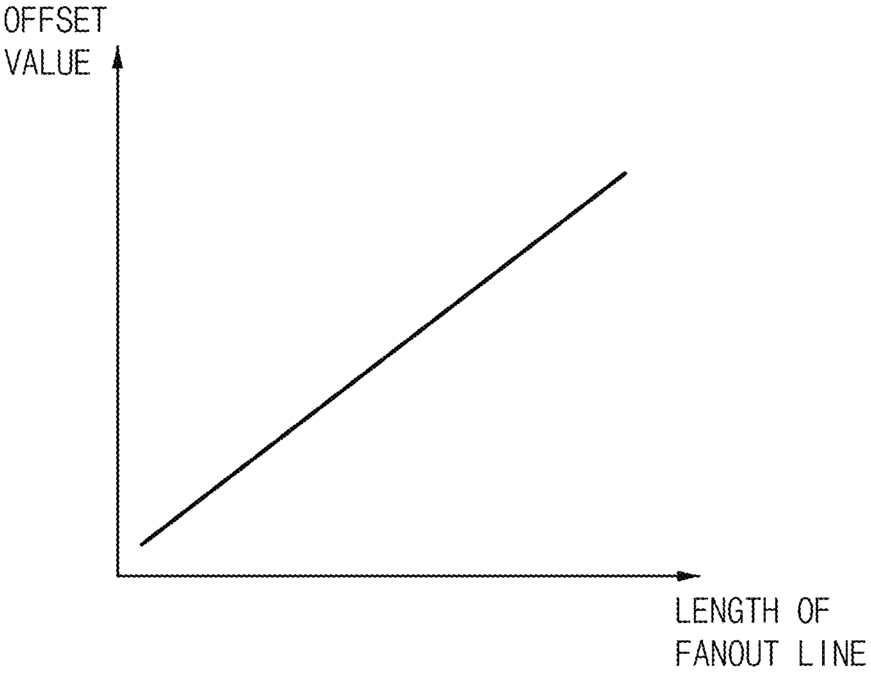
Figure 18D:
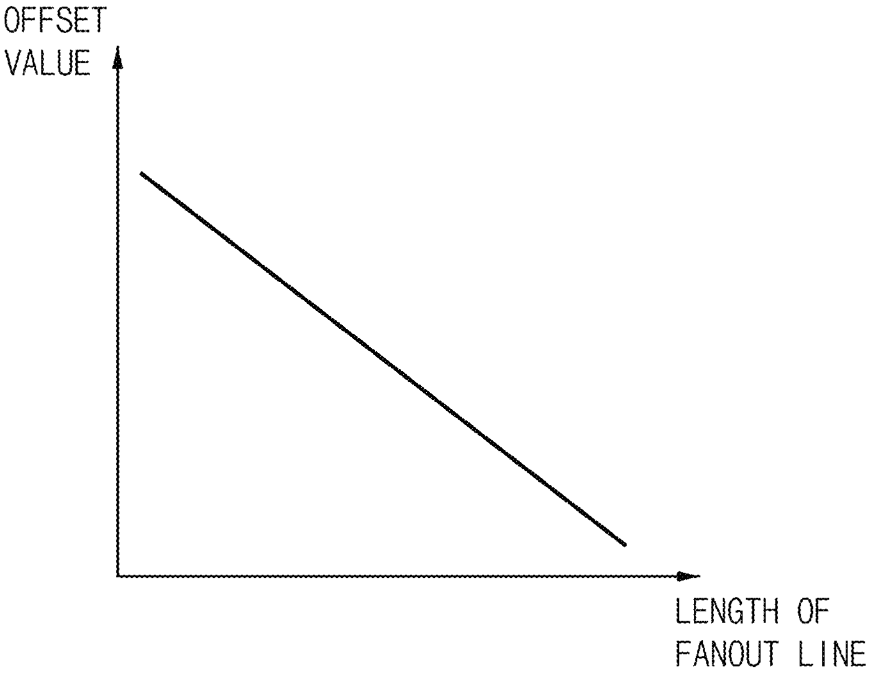

Referring to FIGS. 18C and 18D, examples of the change in an offset value depending on a length of the fan-out line are illustrated.

As described with reference to FIG. 7, the length of the fan-out line connected to the data line may be changed depending on the position in the display panel 100. Therefore, the operation of selecting the at least one selected source channel based on the positions of the plurality of source channels may be described as an operation of selecting the at least one selected source channel based on the length of the fan-out line.

In example embodiments, as illustrated in FIG. 18C, as the length of the fan-out line increases, the second offset value applied to the at least one selected source channel may increase. In example embodiments, as illustrated in FIG. 18D, as the length of the fan-out line increases, the second offset value applied to the at least one selected source channel may decrease. However, example embodiments are not limited thereto, and a relationship between the length of the fan-out line and the second offset value may be variously determined according to example embodiments.

In example embodiments, the display apparatus according to example embodiments may be implemented by combining two or more of the examples of FIGS. 13, 15 and 17.

Figure 19:
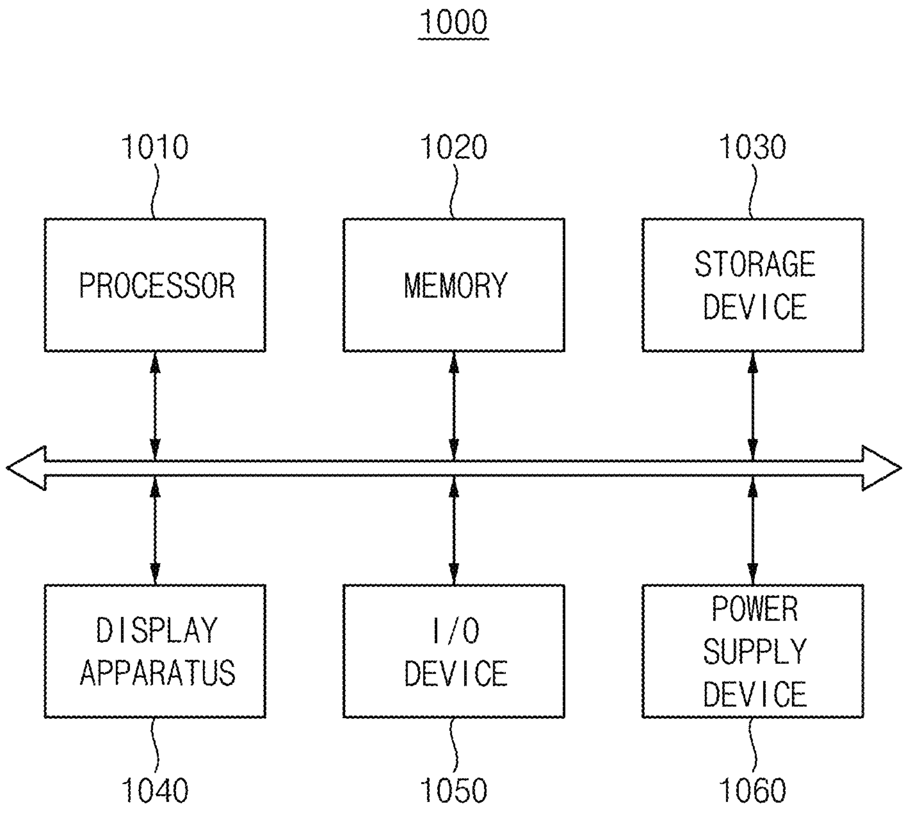
FIG. 19 is a block diagram illustrating an electronic system including a display apparatus according to example embodiments.

FIG. 19 is a block diagram illustrating an electronic system 1000 including a display apparatus 1040 according to example embodiments.

Referring to FIG. 19, the electronic system 1000 includes a processor 1010, a memory 1020, a storage device 1030, the display apparatus 1040, an input/output (I/O) device 1050 and a power supply device 1060.

The processor 1010 may perform various computational functions such as particular calculations and tasks. For example, the processor 1010 may be a central processing unit (CPU), a microprocessor, an application processor (AP), etc.

The memory 1020 and the storage device 1030 may store data required for operating the electronic system 1000 and/or data processed by the processor 1010. For example, the memory 1020 may include a volatile memory such as a dynamic random access memory (DRAM), a static random access memory (SRAM), etc., and/or a nonvolatile memory such as an electrically erasable programmable read-only memory (EEPROM), a flash memory, a phase change random access memory (PRAM), a resistance random access memory (RRAM), a magnetic random access memory (MRAM), a ferroelectric random access memory (FRAM), a nano floating gate memory (NFGM), or a polymer random access memory (PoRAM), etc. The storage device 1030 may include a CD-ROM, a hard disk drive (HDD), a solid state drive (SSD), etc.

The I/O device 1050 may include at least one input device such as a keypad, a button, a microphone, a touch screen, etc., and/or at least one output device such as a speaker, a printer, etc. The power supply device 1060 may provide power to the electronic system 1000.

The display apparatus 1040 may be the display apparatus according to example embodiments. For example, as described with reference to FIGS. 1 through 12, the offset values may be applied differently for channels and/or lines in the display apparatus 1040. For example, as described with reference to FIGS. 13 through 18, the offset values may be applied further differently for temperature, luminance and/or positions in the display apparatus 1040. Accordingly, the load deviation may be efficiently compensated, and the degradation of display quality may be prevented.

The example embodiments may be applied to various devices and/or systems including the display apparatuses. For example, the example embodiments may be applied to systems such as a personal computer (PC), a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IOT) device, an internet of everything (IoE) device, an e-book reader, a virtual reality (VR) device, an augmented reality (AR) device, a robotic device, a drone, etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A display apparatus comprising:
a display panel including:
a plurality of sub-pixels each of which includes a pixel circuit and a light emitting element, the plurality of sub-pixels including:
first sub-pixels configured to display a first color;
second sub-pixels configured to display a second color; and
third sub-pixels configured to display a third color;
a plurality of pixel columns including:
a first pixel column in which the first sub-pixels and the third sub-pixels are alternately disposed;
a second pixel column in which the second sub-pixels are disposed;

a third pixel column in which the third sub-pixels and the first sub-pixels are alternately disposed; and a fourth pixel column in which the second sub-pixels are disposed; and a plurality of data lines including:

a first data line connected to the third sub-pixels in the first and third pixel columns;

a second data line connected to the second sub-pixels in the second pixel column;

a third data line connected to the first sub-pixels in the third pixel column;

a fourth data line connected to the second sub-pixels in the fourth pixel column; and an additional data line connected to the first sub-pixels in the first pixel column;

a data driver configured to adjust a voltage level of an additional data voltage by applying an offset value to the additional data voltage, the data driver including:

a plurality of source channels including:

a first source channel configured to provide a first data voltage corresponding to the third color to the first data line;

a second source channel configured to provide a second data voltage corresponding to the second color to the second data line;

a third source channel configured to provide a third data voltage corresponding to the first color to the third data line;

a fourth source channel configured to provide a fourth data voltage corresponding to the second color to the fourth data line; and an additional source channel configured to provide the additional data voltage corresponding to the first color to the additional data line; and a channel controller configured to select the additional source channel among the plurality of source channels, and to generate the offset value for the additional source channel.

2. The display apparatus of claim 1, wherein the offset value is changeable.

3. The display apparatus of claim 2, wherein the channel controller is configured to change the offset value applied to the additional data voltage depending on positions of the first sub-pixels in the first pixel column connected to the additional data line.

4. The display apparatus of claim 1, wherein the channel controller is configured to select at least one selected source channel other than the additional source channel among the plurality of source channels, and to generate a second offset value for the at least one selected source channel, and wherein the data driver is configured to adjust a voltage level of a selected data voltage provided by the at least one selected source channel by applying the second offset value to the selected data voltage.

5. The display apparatus of claim 4, further comprising:

a temperature sensor configured to detect an operating temperature, and wherein the channel controller is configured to select the at least one selected source channel based on the operating temperature detected by the temperature sensor.

6. The display apparatus of claim 4, wherein the channel controller is configured to select the at least one selected source channel based on luminance of an image displayed on the display panel.

7. The display apparatus of claim 4, wherein the channel controller is configured to select the at least one selected source channel based on positions of the plurality of source channels.

8. The display apparatus of claim 7, wherein, among the plurality of source channels, a source channel connected to sub-pixels disposed at a center of the display panel is selected as the at least one selected source channel.

9. The display apparatus of claim 1, wherein the plurality of pixel columns further include:

a fifth pixel column in which the first sub-pixels and the third sub-pixels are alternately disposed;

a sixth pixel column in which the second sub-pixels are disposed;

a seventh pixel column in which the third sub-pixels and the first sub-pixels are alternately disposed; and an eighth pixel column in which the second sub-pixels are disposed, wherein the plurality of data lines further include:

a fifth data line connected to the third sub-pixels in the fifth and seventh pixel columns;

a sixth data line connected to the second sub-pixels in the sixth pixel column;

a seventh data line connected to the first sub-pixels in the seventh pixel column; and an eighth data line connected to the second sub-pixels in the eighth pixel column, wherein the display panel further includes:

first fan-out lines connected to the first, second, third and fourth data lines; and second fan-out lines connected to the fifth, sixth, seventh and eighth data lines, and wherein the first fan-out lines and the second fan-out lines are alternately disposed in a peripheral region of the display panel.

10. The display apparatus of claim 9, wherein the plurality of source channels further include:

a fifth source channel configured to provide a fifth data voltage corresponding to the third color to the fifth data line;

a sixth source channel configured to provide a sixth data voltage corresponding to the second color to the sixth data line;

a seventh source channel configured to provide a seventh data voltage corresponding to the first color to the seventh data line; and an eighth source channel configured to provide an eighth data voltage corresponding to the second color to the eighth data line, wherein a source output remapping is performed on at least some of the first, second, third, fourth, fifth, sixth, seventh and eighth source channels, wherein the channel controller is configured to select remapped source channels on which the source output remapping is performed among the first, second, third, fourth, fifth, sixth, seventh and eighth source channels, and to generate a second offset value for the remapped source channels, and wherein the data driver is configured to apply the second offset value to data voltages provided by the remapped source channels.

11. A display apparatus comprising:

a display panel including:

a plurality of sub-pixels each of which includes a pixel circuit and a light emitting element, the plurality of sub-pixels including:

first sub-pixels configured to display a first color;

second sub-pixels configured to display a second color; and
third sub-pixels configured to display a third color;
a plurality of data lines including:
first data lines connected to the first sub-pixels;
second data lines connected to the second sub-pixels; and
third data lines connected to the third sub-pixels;
a plurality of fan-out lines including:
first fan-out lines connected to data lines connected to sub-pixels disposed in a first display region of the display panel;
second fan-out lines connected to data lines connected to sub-pixels disposed in a second display region of the display panel, the second display region being adjacent to the first display region, the first fan-out lines and the second fan-out lines being alternately disposed in a peripheral region of the display panel; and
third fan-out lines connected to data lines connected to sub-pixels disposed in a third display region of the display panel, the third display region being adjacent to the second display region;
a data driver configured to output remapped data voltages to remapped source channels on which a source output remapping is performed, and to adjust voltage levels of the remapped data voltages by applying an offset value to the remapped data voltages, the data driver including:
a plurality of source channels including:
first source channels configured to provide first data voltages corresponding to the first color to the first data lines;
second source channels configured to provide second data voltages corresponding to the second color to the second data lines; and
third source channels configured to provide third data voltages corresponding to the third color to the third data lines; and
a channel controller configured to select the remapped source channels that is some of the plurality of source channels, and to generate the offset value for the remapped source channels.

12. The display apparatus of claim 11, wherein the offset value is changeable.

13. The display apparatus of claim 12, wherein the channel controller is configured to change the offset value applied to the remapped data voltages depending on positions of the remapped source channels.

14. The display apparatus of claim 11, wherein the channel controller is configured to select at least one selected source channel other than the remapped source channels among the plurality of source channels, and to generate a second offset value for the at least one selected source channel, and
wherein the data driver is configured to adjust a voltage level of a selected data voltage provided by the at least one selected source channel by applying the second offset value to the selected data voltage.

15. The display apparatus of claim 14, further comprising:
a temperature sensor configured to detect an operating temperature, and
wherein the channel controller is configured to select the at least one selected source channel based on the operating temperature detected by the temperature sensor.

16. The display apparatus of claim 14, wherein the channel controller is configured to select the at least one selected source channel based on luminance of an image displayed on the display panel.

17. The display apparatus of claim 14, wherein the channel controller is configured to select the at least one selected source channel based on positions of the plurality of source channels.

18. The display apparatus of claim 17, wherein, among the plurality of source channels, a source channel connected to sub-pixels disposed at a center of the display panel is selected as the at least one selected source channel.

19. The display apparatus of claim 11,
wherein the display panel further includes a plurality of pixel columns,
wherein the plurality of pixel columns include:
a first pixel column in which the first sub-pixels and the third sub-pixels are alternately disposed;
a second pixel column in which the second sub-pixels are disposed;
a third pixel column in which the third sub-pixels and the first sub-pixels are alternately disposed; and
a fourth pixel column in which the second sub-pixels are disposed, wherein one of the third data lines is connected to the third sub-pixels in the first and third pixel columns,
wherein one of the second data lines is connected to the second sub-pixels in the second pixel column,
wherein one of the first data lines is connected to the first sub-pixels in the third pixel column,
wherein another one of the second data lines is connected to the second sub-pixels in the fourth pixel column,
wherein the plurality of data lines further include:
an additional data line connected to the first sub-pixels in the first pixel column, and
wherein the plurality of fan-out lines further include:
a fourth fan-out line connected to the additional data line.

20. The display apparatus of claim 19,
wherein the plurality of source channels further include:
an additional source channel configured to provide an additional data voltage corresponding to the first color to the additional data line,
wherein the channel controller is configured to select the additional source channel, and to generate a second offset value for the additional source channel, and
wherein the data driver is configured to apply the second offset value to the additional data voltage provided by the additional source channel.

* * * * *